United States Patent
Uchida

(10) Patent No.: US 8,300,109 B2
(45) Date of Patent: Oct. 30, 2012

(54) IMAGE SENSING APPARATUS

(75) Inventor: Mineo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 12/483,780

(22) Filed: Jun. 12, 2009

(65) Prior Publication Data

US 2009/0316033 A1 Dec. 24, 2009

(30) Foreign Application Priority Data

Jun. 18, 2008 (JP) ................................. 2008-159692

(51) Int. Cl.
*H04N 5/225* (2006.01)
*H04N 5/335* (2006.01)
*H04N 3/14* (2006.01)

(52) U.S. Cl. ...................... 348/220.1; 348/308; 348/317

(58) Field of Classification Search ............... 348/220.1, 348/221.1, 294, 302–304, 308, 312–323
See application file for complete search history.

(56) References Cited

U.S. PATENT DOCUMENTS

| | | | | |
|---|---|---|---|---|
| 7,110,025 B1 * | 9/2006 | Loui et al. | ................... | 348/220.1 |
| 7,312,821 B2 * | 12/2007 | Voss et al. | ................... | 348/220.1 |
| 7,551,203 B2 * | 6/2009 | Nakayama et al. | ........ | 348/222.1 |
| 7,903,162 B2 * | 3/2011 | Juen | .......................... | 348/333.01 |
| 8,130,279 B2 * | 3/2012 | Masaki | ....................... | 348/220.1 |
| 2002/0196348 A1 * | 12/2002 | Kubo | ......................... | 348/220.1 |
| 2003/0095191 A1 * | 5/2003 | Saito | .......................... | 348/220.1 |
| 2005/0168589 A1 * | 8/2005 | Silverstein et al. | ........ | 348/220.1 |
| 2006/0221204 A1 * | 10/2006 | Ogawa | ....................... | 348/223.1 |

FOREIGN PATENT DOCUMENTS

| | | |
|---|---|---|
| JP | 2000-134549 | 5/2000 |
| JP | 2005-012403 | 1/2005 |
| JP | 2007-028337 | 2/2007 |
| JP | 2007-324985 A | 12/2007 |

* cited by examiner

*Primary Examiner* — Nhan T Tran
*Assistant Examiner* — Tuan Le
(74) *Attorney, Agent, or Firm* — Cowan, Liebowitz & Latman, P.C.

(57) ABSTRACT

An image sensing apparatus comprises: a pixel array; a driving unit; a readout unit which, when performing still image shooting parallel to movie shooting, reads out, in each of successive frame periods, first signals from a first pixel group, and reads out, over the successive frame periods, second signals of a first frame period from pixels of a second pixel group that are different from each other between the successive frame periods; and a generation unit which generates an image signal for a movie of one frame in each of the successive frame periods from the first signals read out in each of the successive frame periods, and also generates an image signal for a still image of one frame in the first frame period by composing the first signals read out in the first frame period and the second signals read out over the successive frame periods.

5 Claims, 25 Drawing Sheets

FIG. 34

IMAGE SENSING APPARATUS

BACKGROUND OF THE INVENTION

1. Field of the Invention

The present invention relates to an image sensing apparatus.

2. Description of the Related Art

Recent popular image sensing apparatuses such as a digital camera and digital video camera can capture both still images and movies using image sensors such as a CMOS image sensor.

When capturing a movie with an image sensor, the image sensing apparatus requires an electronic shutter function to control the exposure of the image sensor because it is difficult to use a mechanical shutter. The electronic shutter function controls the shutter speed by changing the charge accumulation time of pixels in accordance with the brightness of an object to accumulate a signal at an appropriate level. The electronic shutter function includes a simultaneous electronic shutter function and slit rolling electronic shutter function, as described in Japanese Patent Laid-Open No. 2007-028337.

Some image sensing apparatuses of this type can interrupt movie shooting to perform still image shooting. In the movie shooting mode, the image sensing apparatus records a movie continuously captured by an image sensor, and displays it on a display such as an LCD (Liquid Crystal Display). In the still image shooting mode, the image sensing apparatus displays a movie continuously captured by the image sensor on the display without recording it. Upon receiving a still image shooting instruction via a shutter button or the like in the still image shooting mode, the image sensing apparatus suspends an electronic viewfinder function used in movie shooting, and executes still image shooting.

Required Performances differ between still image shooting and movie shooting. Still image shooting requires high spatial resolutions, while movie shooting requests high temporal resolutions.

More specifically, the number of pixels requested of still image shooting often exceeds 10,000,000 pixels, while the number of pixels requested of movie shooting is about 300,000 pixels or 2,000,000 pixels at most even for the full high-vision (HDTV) standard. The frame rate necessary for still image shooting is not particularly limited, while the frame rate necessary for movie shooting is about 30 frames/sec or 60 frames/sec.

To read out signals of as many pixels as requested of still image shooting from a pixel array at a frame rate necessary for movie shooting, the image sensor needs to be driven at very high speed, consuming a high power. To avoid this high power consumption, the movie shooting mode often adopts a method of thinning out pixels vertically or horizontally from the pixel array of an image sensor and reading out signals from the remaining pixels because the necessary number of pixels is smaller than that of a still image.

Some image sensing apparatuses can perform still image shooting parallel to movie shooting.

Assume that a still image is formed from one frame of a movie obtained by thinning-out readout in order to perform still image shooting parallel to movie shooting. In this case, still image data generated from a movie image does not satisfy the number of pixels requested of still image shooting. A still image obtained from the generated still image data is poor in spatial resolution.

Assume that the movie frame rate is temporarily decreased upon receiving a still image shooting instruction, and signals are read out from all the pixels of the pixel array of an image sensor in order to execute still image shooting parallel to movie shooting. In this case, movie data is generated at the temporarily low frame rate. A movie obtained from the movie data is poor in temporal resolution.

To solve this, Japanese Patent Laid-Open No. 2005-012403 discloses a technique of reading out signals from rows which change by thinning-out between a predetermined number of successive frame periods, and generating the signals of the rows read out in the predetermined number of frame periods. According to Japanese Patent Laid-Open No. 2005-012403, still image data of one frame can be generated from the signals of pixels on all the rows of the pixel array. A still image with high spatial resolution can be attained without decreasing the movie frame rate.

Japanese Patent Laid-Open No. 2000-134549 discloses a technique of reading out signals from pixels which change by sampling between a predetermined number of successive frame periods, and composing the signals of the pixels read out in the predetermined number of frame periods, thereby reconstructing a still image. According to Japanese Patent Laid-Open No. 2000-134549, still image data of one frame can be reconstructed from the signals of all the pixels of the pixel array. A still image with high spatial resolution can be provided without decreasing the movie frame rate.

As described above, in the techniques disclosed in Japanese Patent Laid-Open Nos. 2005-012403 and 2000-134549, still image data of one frame is generated by composing the signals of different pixels that have been accumulated in different frame periods. This may impair the simultaneity of accumulation of 1-frame still image data between pixels. Especially when an object is moving, the object position may change between pixel rows or pixels. The spatial resolution of an obtained still image may substantially lower.

SUMMARY OF THE INVENTION

The present invention provides for obtaining a still image with high spatial resolution that improves the simultaneity of accumulation while suppressing a decrease in frame rate.

According to one aspect of the present invention, there is provided an image sensing apparatus comprising: a pixel array in which a plurality of pixels are arrayed in a direction along a row and a direction along a column, the plurality of pixels including a first pixel group and a second pixel group; a driving unit which causes the first pixel group to perform accumulation operations of first signals in each of successive frame periods, and causes the second pixel group to perform accumulation operations of second signals in a first frame period of the successive frame periods; a readout unit which, when performing still image shooting parallel to movie shooting, reads out, in each of the successive frame periods, the first signals from the first pixel group, and reads out, over the successive frame periods, the second signals of the first frame period from pixels of the second pixel group that are different from each other between the successive frame periods; and a generation unit which generates an image signal for a movie of one frame in each of the successive frame periods from the first signals read out in each of the successive frame periods, and also generates an image signal for a still image of one frame in the first frame period by composing the first signals read out in the first frame period and the second signals read out over the successive frame periods.

The present invention can obtain a still image with high spatial resolution that improves the simultaneity of accumulation while suppressing a decrease in frame rate.

Further features of the present invention will become apparent from the following description of exemplary embodiments with reference to the attached drawings.

BRIEF DESCRIPTION OF THE DRAWINGS

FIG. 34 is a chart schematically showing an operation in the movie/still image parallel shooting mode.

DESCRIPTION OF THE EMBODIMENTS

Figure 1:
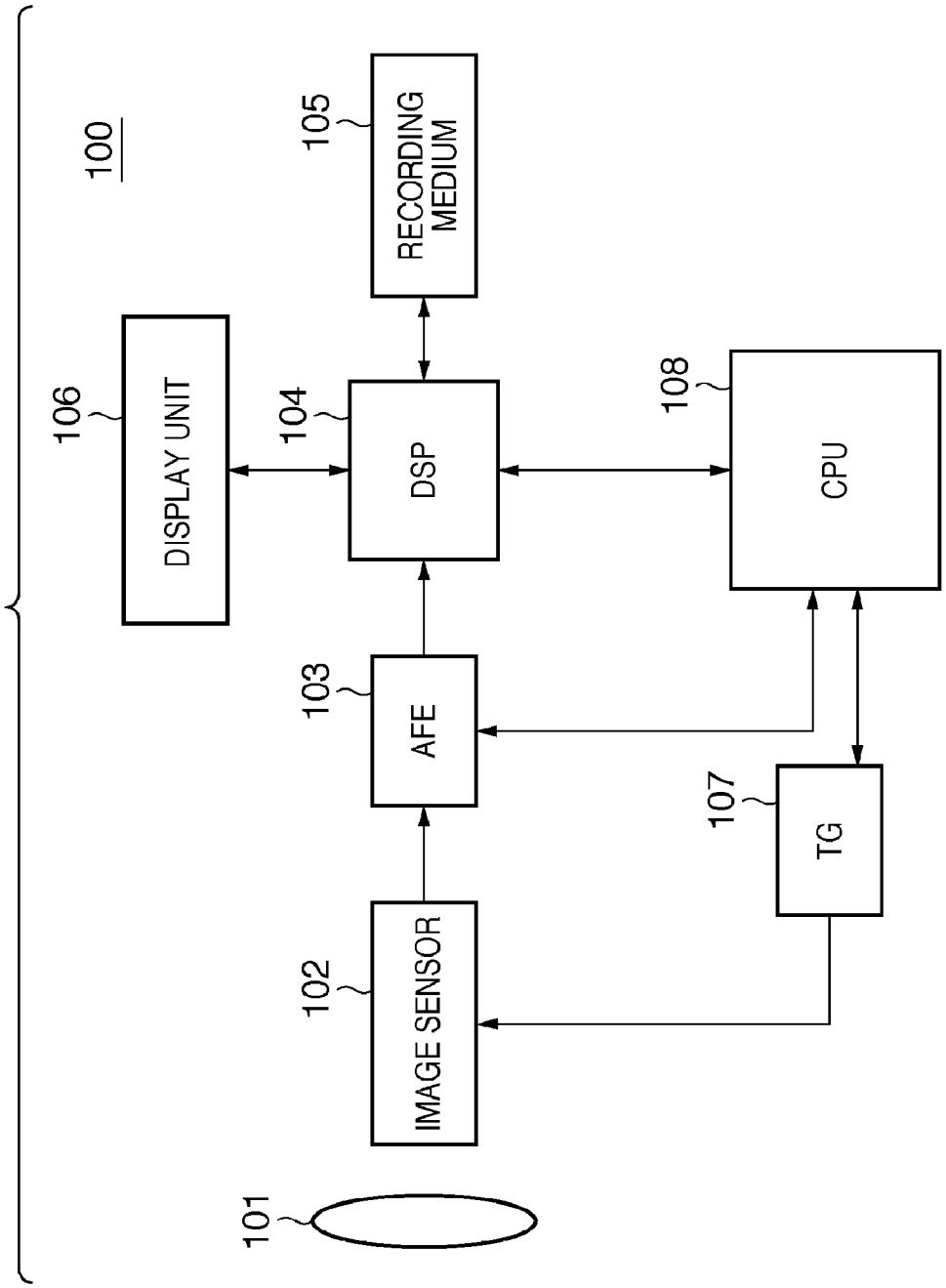
FIG. 1 is a block diagram of the arrangement of an image sensing apparatus 100 according to the first embodiment of the present invention.

An image sensing apparatus 100 according to the first embodiment of the present invention will be explained with reference to FIG. 1. FIG. 1 is a block diagram of the arrangement of the image sensing apparatus 100 according to the first embodiment of the present invention.

The image sensing apparatus 100 according to the first embodiment employs a simultaneous electronic shutter function as an electronic shutter function. The image sensing apparatus 100 includes the following constituent elements.

An imaging lens 101 forms the optical image of an object on the image sensing surface (pixel array) of an image sensor 102.

The image sensor 102 converts an optical image formed on the image sensing surface (pixel array) into an image signal. The image sensor 102 reads out the converted image signal from the pixel array, and outputs it. The image sensor 102 is, e.g., a CMOS image sensor.

A CPU 108 receives an instruction from the user via an operation member (not shown) such as a shutter button, and controls an AFE (Analog Front End) 103, DSP (Digital Signal Processor) 104, and TG (Timing Generator) 107 in accordance with the received instruction. The AFE 103 receives an analog image signal output from the image sensor 102. The AFE 103 performs analog signal processing such as A/D conversion processing for the received analog image signal under the control of the CPU 108. The AFE 103 includes, e.g., an A/D converter, and executes A/D conversion processing for an analog image signal, generating a digital image signal. The AFE 103 outputs the converted digital image signal.

The DSP 104 receives a digital image signal output from the AFE 103. The DSP 104 performs digital signal processing such as various image processings and compression/decompression processing for the received digital image signal under the control of the CPU 108.

For example, the DSP 104 executes predetermined signal processing for a digital image signal, generating recording image data. The DSP 104 records the generated recording image data on a recording medium 105. The recording medium 105 is detachably connected to the DSP 104.

Also, for example, the DSP 104 performs predetermined signal processing for a digital image signal, generating a display image signal (analog signal). The DSP 104 supplies the generated display image signal to a display unit 106.

The display unit 106 displays a display image signal received from the DSP 104, a variety of menu windows, and the like.

The TG 107 generates a predetermined driving signal and supplies it to the image sensor 102 under the control of the CPU 108.

Figure 2:
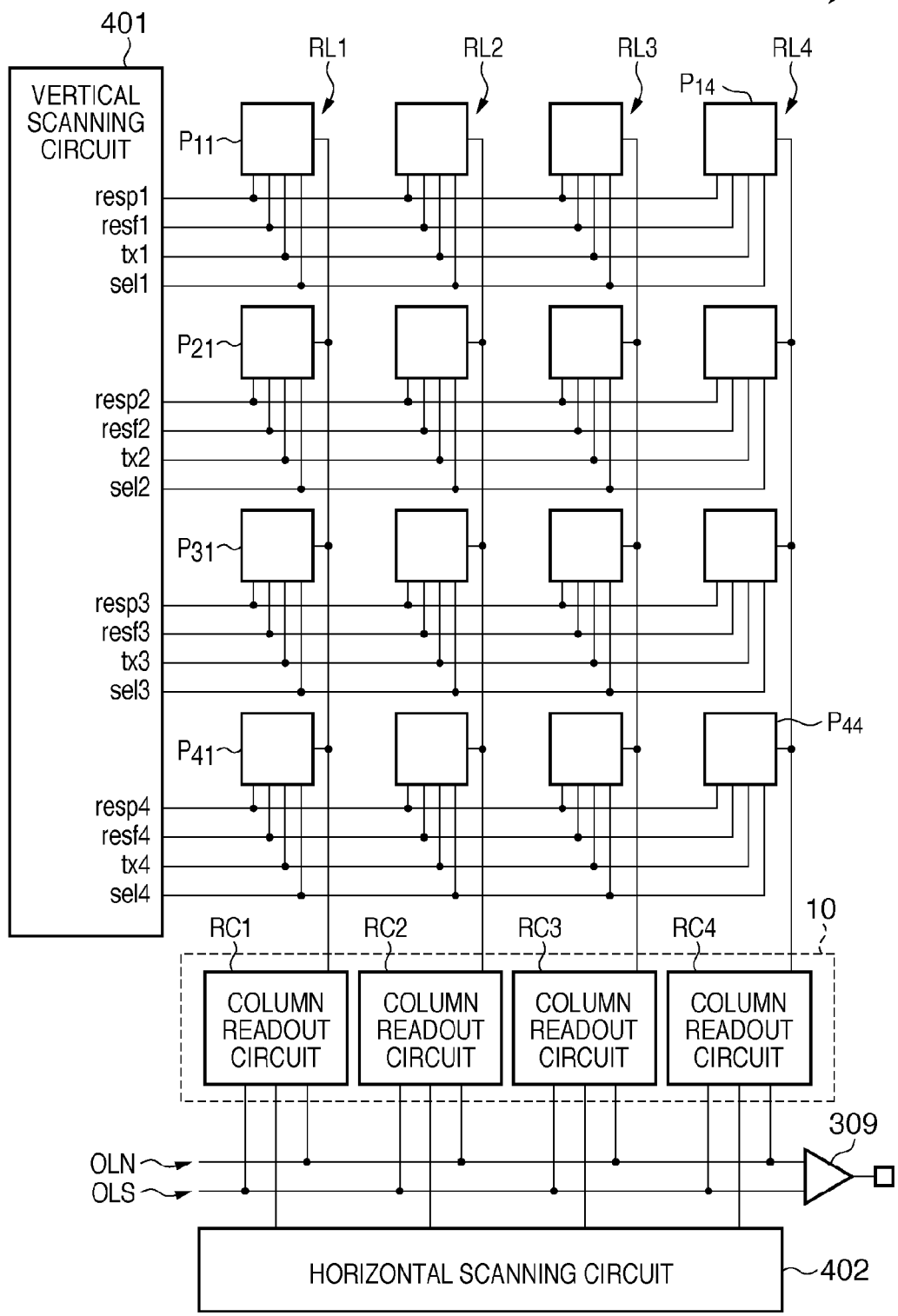
FIG. 2 is a diagram of the arrangement of an image sensor 102.

The arrangement of the image sensor 102 will be explained with reference to FIG. 2. FIG. 2 is a diagram of the arrangement of the image sensor 102.

The image sensor 102 includes the following constituent elements.

In a pixel array PA, a plurality of pixels $P_{11}$ to $P_{44}$ including a first pixel group PG1 and second pixel group PG2 (see FIG.

5) are arrayed (two-dimensionally) in directions along rows and columns. In FIG. 2, the pixel array PA is made up of 4×4 pixels.

A readout unit 10 includes a plurality of column readout circuits RC1 to RC4. The column readout circuits RC1 to RC4 are connected to pixels on corresponding columns in the pixel array PA via column signal lines RL1 to RL4. The column readout circuits RC1 to RC4 read out signals from pixels on a selected readout row in the pixel array PA via the column signal lines RL1 to RL4, and hold them.

A vertical scanning circuit (driving unit) 401 drives the pixel array PA. For example, the vertical scanning circuit (driving unit) 401 drives the pixel array PA so that the readout unit 10 reads out signals via the column signal lines RL1 to RL4 from a target row (readout row) in the pixel array PA. Upon receiving a driving signal from the TG 107, the vertical scanning circuit 401 supplies a predetermined control signal to the pixels of the pixel array PA based on the received driving signal. For example, the vertical scanning circuit 401 supplies first reset control signals "resp1" to "resp4", second reset control signals "resf1" to "resf4", transfer control signals "tx1" to "tx4", and selection control signals "sel1" to "sel4" to the pixels of the pixel array PA.

A horizontal scanning circuit 402 sequentially turns on the horizontal transfer switches of respective columns to sequentially transfer, to an output amplifier 309 via output lines OLS and OLN, the signals of respective columns held in the column readout circuits RC1 to RC4.

The output amplifier 309 generates an image signal based on transferred signals, and outputs it.

Figure 3:
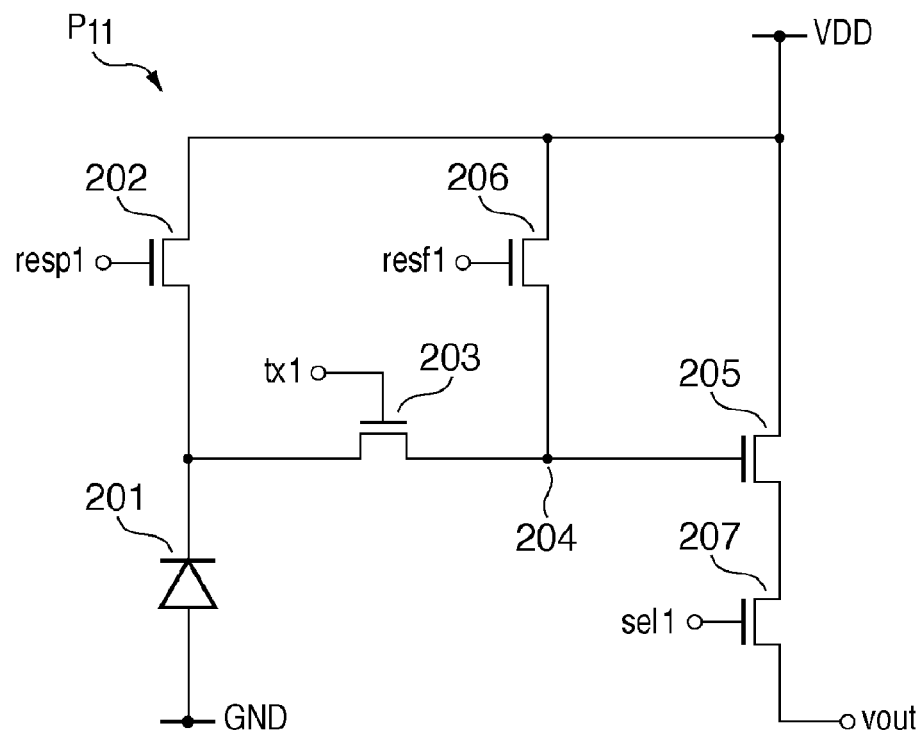
FIG. 3 is a circuit diagram of the structure of a pixel $P_{11}$.

The structure of the pixels $P_{11}$ to $P_{44}$ will be explained with reference to FIG. 3. FIG. 3 is a circuit diagram of the structure of the pixel $P_{11}$. The structure of the pixel $P_{11}$ will be exemplified. The remaining pixels $P_{12}$ to $P_{44}$ also have the same structure as that of the pixel $P_{11}$.

The pixel $P_{11}$ includes the following constituent elements.

A photoelectric conversion unit 201 performs a charge accumulation operation to generate and accumulate charges (signal) corresponding to light. The photoelectric conversion unit 201 is, for example, a photodiode.

A first reset unit 202 resets the photoelectric conversion unit 201 (independently of a charge-voltage converter 204). The first reset unit 202 is, e.g., a first reset MOS transistor. Upon receiving an active-level first reset control signal "resp1" at the gate from the vertical scanning circuit 401, the first reset unit 202 is turned on to reset the photoelectric conversion unit 201. Upon completion of resetting the photoelectric conversion unit 201, the first reset unit 202 causes the photoelectric conversion unit 201 to start the charge accumulation operation.

A transfer unit 203 transfers charges generated in the photoelectric conversion unit 201 to the charge-voltage converter 204 in an active state, and does not transfer them to the charge-voltage converter 204 in a nonactive state. The transfer unit 203 is, for example, a transfer MOS transistor. Upon receiving an active-level transfer control signal "tx1" at the gate from the vertical scanning circuit 401, the transfer unit 203 is turned on (becomes active) to transfer charges generated in the photoelectric conversion unit 201 to the charge-voltage converter 204.

The charge-voltage converter (charge holding unit) 204 holds transferred charges. The charge-voltage converter 204 converts the held charges into a voltage. The charge-voltage converter 204 is, for example, a floating diffusion.

A second reset unit 206 resets the charge-voltage converter 204 (independently of the photoelectric conversion unit 201). The second reset unit 206 is, for example, a second reset MOS transistor. Upon receiving an active-level second reset control signal "resf1" at the gate from the vertical scanning circuit 401, the second reset unit 206 is turned on to reset the charge-voltage converter 204.

An output unit 205 outputs a signal corresponding to the voltage of the charge-voltage converter 204. While the charge-voltage converter 204 is reset, the output unit 205 outputs an N signal corresponding to the voltage of the charge-voltage converter 204. While charges in the photoelectric conversion unit 201 are transferred to the charge-voltage converter 204, the output unit 205 outputs an S signal corresponding to the voltage of the charge-voltage converter 204. The output unit 205 is, for example, an amplification MOS transistor.

A selection unit 207 selects/deselects the pixel $P_{11}$. The selection unit 207 is, for example, a selection MOS transistor. Upon receiving an active-level selection control signal "sel1" at the gate from the vertical scanning circuit 401, the selection unit 207 is turned on to select the pixel $P_{11}$. Upon receiving a nonactive-level selection control signal "sel1" at the gate from the vertical scanning circuit 401, the selection unit 207 is turned off to deselect the pixel $P_{11}$.

Figure 4:
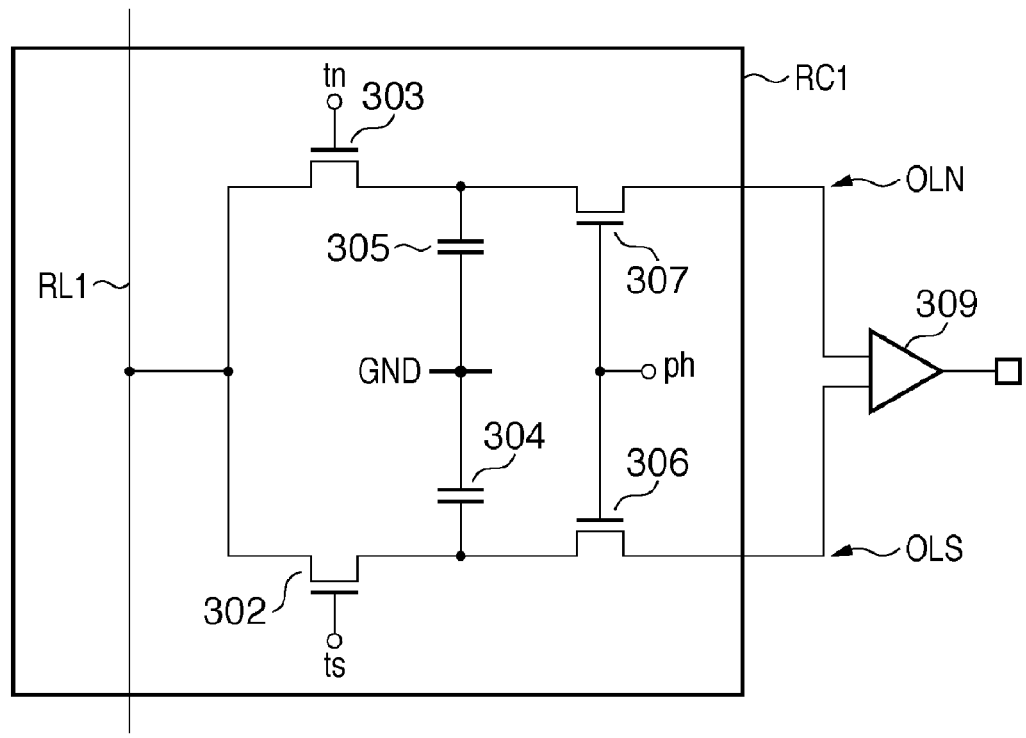
FIG. 4 is a circuit diagram of the structure of a column readout circuit RC1.

The structure of the column readout circuits RC1 to RC4 will be explained with reference to FIG. 4. FIG. 4 is a circuit diagram of the structure of the column readout circuit RC1. The structure of the column readout circuit RC1 will be exemplified. The remaining column readout circuits RC2 to RC4 also have the same structure as that of the column readout circuit RC1.

The column readout circuit RC1 includes the following constituent elements.

Upon receiving an active-level control signal "ts" from the TG 107, an S signal transfer switch 302 is turned on to transfer an S signal read out from one of the pixels $P_{11}$, $P_{21}$, $P_{31}$, and $P_{41}$ on the first column to an S signal holding capacitance 304.

Upon receiving an active-level control signal "tn" from the TG 107, an N signal transfer switch 303 is turned on to transfer an N signal read out from one of the pixels $P_{11}$, $P_{21}$, $P_{31}$, and $P_{41}$ on the first column to an N signal holding capacitance 305.

When the TG 107 supplies a nonactive-level control signal "ts" to the S signal transfer switch 302 to turn it off, the S signal holding capacitance 304 starts holding a transferred S signal.

When the TG 107 supplies a nonactive-level control signal "tn" to the N signal transfer switch 303 to turn it off, the N signal holding capacitance 305 starts holding a transferred N signal.

Upon receiving an active-level horizontal scanning signal "ph" from the horizontal scanning circuit 402, a horizontal transfer switch 306 is turned on to transfer an S signal held in the S signal holding capacitance 304 from the S signal holding capacitance 304 to the output line OLS.

Upon receiving an active-level horizontal scanning signal "ph" from the horizontal scanning circuit 402, a horizontal transfer switch 307 is turned on to transfer an N signal held in the N signal holding capacitance 305 from the N signal holding capacitance 305 to the output line OLN.

An output amplifier 309 executes CDS (Correlated Double Sampling) processing to calculate the difference between an S signal transferred via the output line OLS and an N signal transferred via the output line OLN, generating and outputting an image signal.

The operation of the image sensing apparatus 100 will be explained next.

Figure 5:
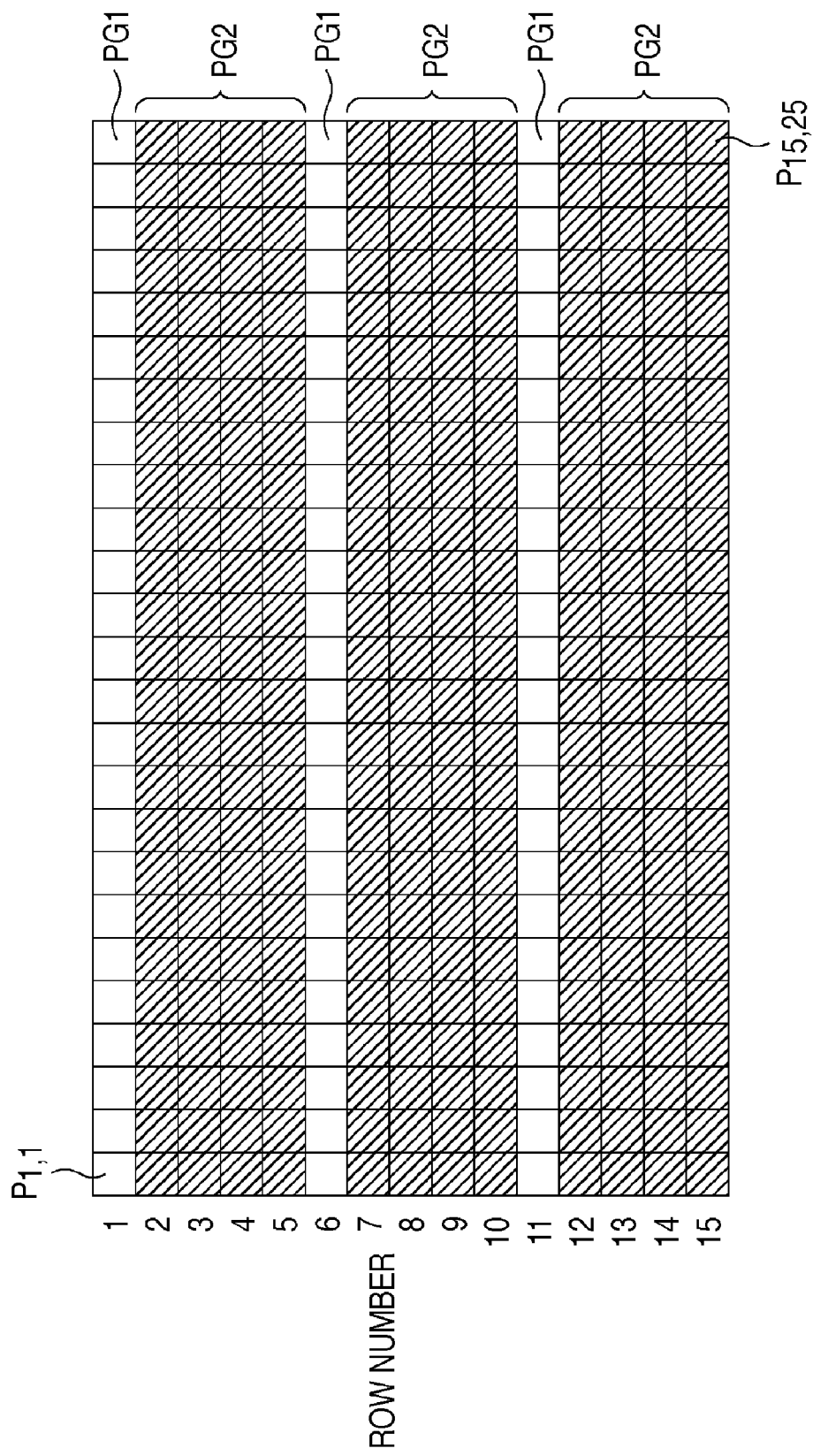
FIG. 5 is a view showing a pixel array PA made up of 15×25 pixels $P_{1,1}$ to $P_{15,25}$.

The arrangement of the image sensing apparatus 100 has been described using the pixel array PA (see FIG. 2) made up of 4×4 pixels $P_{11}$ to $P_{44}$. The operation of the image sensing apparatus 100 will be explained using a pixel array PA made up of 15×25 pixels $P_{11}$ to $P_{15,25}$. FIG. 5 is a view showing the pixel array PA made up of 15×25 pixels $P_{1,1}$ to $P_{15,25}$.

In the still image shooting mode, the image sensing apparatus 100 generates image signals for a still image of one frame from the signals of all the pixels $P_{1,1}$ to $P_{15,25}$, that is, the first pixel group PG1 and second pixel group PG2 in the pixel array PA. The first pixel group PG1 includes pixels on the (5n+1)th rows (n: an integer of 0 or more; in this case, n=0, 1, 2). The first pixel group PG1 includes the pixels $P_{1,1}$ to $P_{1,25}$ on the first row, the pixels $P_{6,1}$ to $P_{6,25}$ on the sixth row, and the pixels $P_{11,1}$ to $P_{11,25}$ on the 11th row. The second pixel group PG2 includes pixels on rows ((5n+2)th, (5n+3)th, (5n+4)th, and (5n+5)th rows) other than those of the first pixel group PG1. The second pixel group PG2 includes pixels on the second to fifth rows, seventh to 10th rows, and 12th to 15th rows.

In the movie shooting mode, the image sensing apparatus 100 generates image signals for a movie of one frame from the signals of the first pixel group PG1. In the movie shooting mode, the second pixel group PG2 is thinned out from the pixel array PA (every fifth rows are selected as readout rows) to read out signals from the first pixel group PG1.

The operation of the image sensing apparatus 100 in a mode (to be referred to as a movie/still image parallel shooting mode hereinafter) in which still image shooting is done parallel to movie shooting will be described later.

Figure 6:
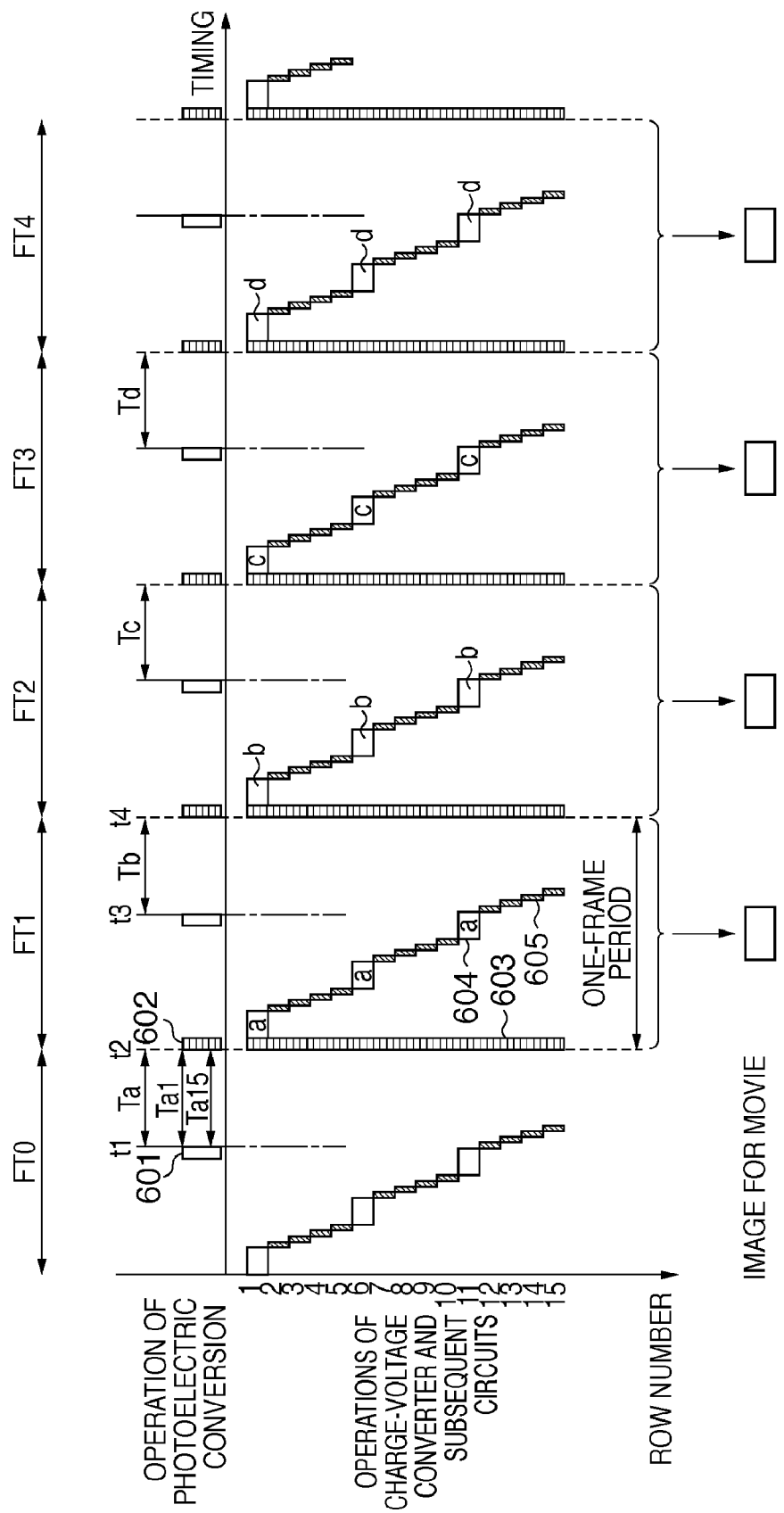
FIG. 6 is a chart schematically showing an operation in the movie shooting mode.

An operation in the movie shooting mode will be explained mainly with reference to FIG. 6. FIG. 6 is a chart schematically showing an operation in the movie shooting mode. In FIG. 6, the abscissa axis represents timings. A part of the ordinate axis above the abscissa axis represents the position of a pixel row associated with the operation of the photoelectric conversion unit. A part of the ordinate axis below the abscissa axis represents the position of a pixel row associated with the operations of the charge-voltage converter and subsequent circuits (mainly the operation of the readout unit).

As shown in FIG. 6, the pixels $P_{1,1}$ to $P_{15,25}$ performs a charge accumulation operation in a first accumulation period group Ta. All first accumulation periods Ta1 to Ta15 in the first accumulation period group overlap each other. That is, the photoelectric conversion units 201 in all the pixels $P_{1,1}$ to $P_{15,25}$ of the pixel array PA execute charge accumulation operations simultaneously.

Suffixes 1 to 15 to the accumulation period name and control signal name correspond to pixel rows. In FIG. 6, different pixels on each row have the same accumulation period.

Figure 7:
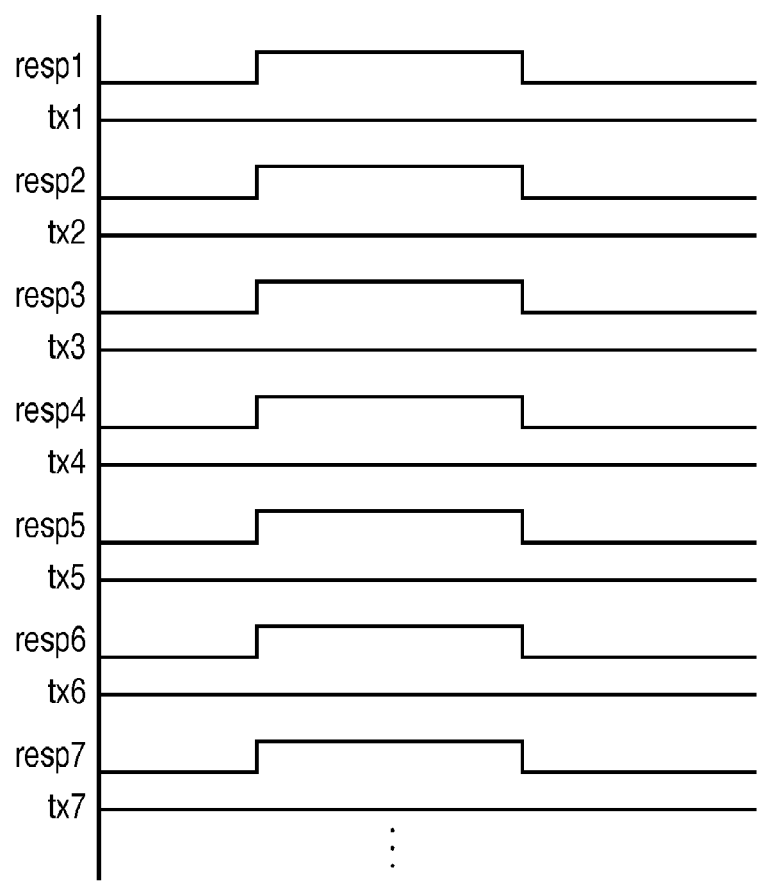
FIG. 7 is a timing chart showing the reset operations of photoelectric conversion units 201 in pixels on respective rows.

In a reset operation 601 shown in FIG. 6, the first reset units 202 (see FIG. 3) complete the reset operations of the photoelectric conversion units 201 simultaneously in all the pixels $P_{1,1}$ to $P_{15,25}$. This will be explained with reference to the timing chart of FIG. 7. FIG. 7 is a timing chart showing the reset operations of the photoelectric conversion units 201 in pixels on respective rows.

The vertical scanning circuit 401 supplies the first reset control signals "resp1" to "resp15" to the pixels on the respective rows, as shown in FIG. 7. More specifically, the first reset control signals "resp1" to "resp15" change from an active level to a nonactive-level to complete the reset operations of the pixels $P_{1,1}$ to $P_{15,25}$ on the respective rows at the same timing. The photoelectric conversion units 201 of the pixels $P_{1,1}$ to $P_{15,25}$ on the respective rows simultaneously start charge accumulation operations. At this time, the transfer control signals "tx1" to "tx15" supplied from the vertical scanning circuit 401 to the pixels on the respective rows are maintained at a nonactive-level. This keeps nonactive the transfer units 203 of the pixels $P_{1,1}$ to $P_{15,25}$ on the respective rows.

Figure 8:
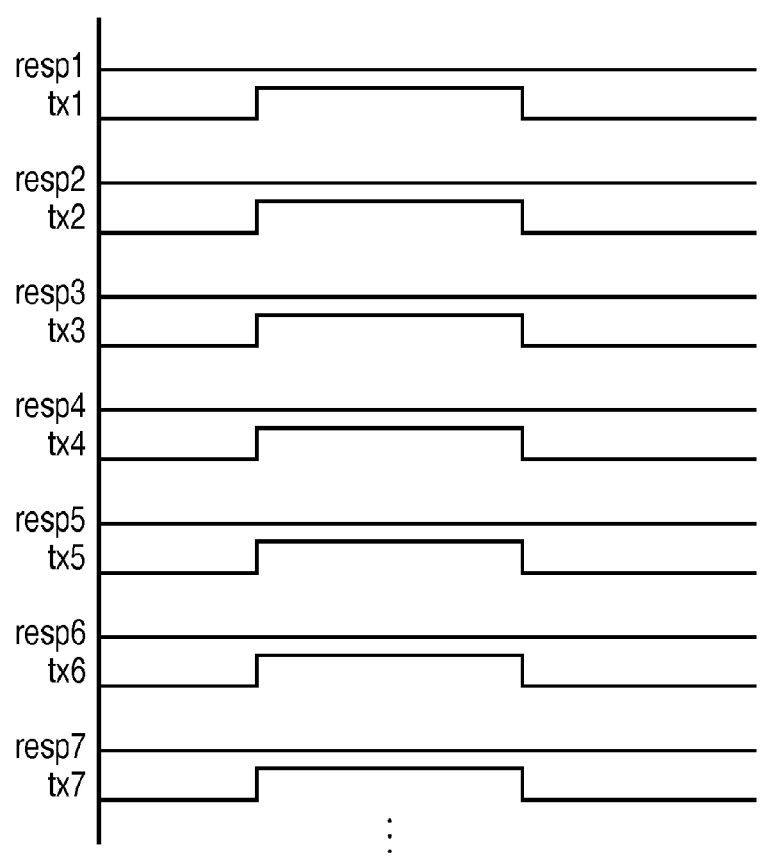
FIG. 8 is a timing chart showing the charge transfer operations of the photoelectric conversion units 201 in pixels on respective rows.

In a transfer operation 602 (or 603) shown in FIG. 6, the transfer units 203 (see FIG. 3) transfer charges in the photoelectric conversion units 201 simultaneously in all the pixels $P_{1,1}$ to $P_{15,25}$. This will be explained with reference to the timing chart of FIG. 8. FIG. 8 is a timing chart showing the charge transfer operations of the photoelectric conversion units 201 in pixels on respective rows.

The vertical scanning circuit 401 supplies the transfer control signals tx1 to tx15 to the pixels on the respective rows, as shown in FIG. 8. More specifically, the transfer control signals "tx1" to "tx15" change from a nonactive-level to an active level to start the charge transfer operations of the pixels $P_{1,1}$ to $P_{15,25}$ on the respective rows at the same timing. Then, the photoelectric conversion units 201 of the pixels $P_{1,1}$ to $P_{15,25}$ on the respective rows simultaneously end charge accumulation operations. At this time, the first reset control signals "resp1" to "resp15" supplied from the vertical scanning circuit 401 to the pixels on the respective rows are maintained at a nonactive-level.

The time interval between a timing t1 and a timing t2 shown in FIG. 6 serves as the first accumulation periods Ta1 to Ta15. The duration of the first accumulation periods Ta1 to Ta15 can be properly controlled to acquire image signals of an appropriate level.

In a first readout operation 604 indicated by blank squares in FIG. 6, the column readout circuits RC1 to RC4 (see FIG. 2) read out signals from the first pixel group PG1 (see FIG. 5) sequentially for respective rows (readout of signals from the second pixel group PG2 is skipped). More specifically, the vertical scanning circuit 401 scans the pixel array PA to sequentially select the first, sixth, and 11th rows (skip the remaining, second to fifth rows, seventh to 10th rows, and 12th to 15th rows). The column readout circuits RC1 to RC4 read out the signals (N and S signals) of pixels on a plurality of columns on a selected row via the column signal lines RL1 to RL4.

Letters "a", "b", "c", and "d" in squares indicating the first readout operation 604 represent accumulation period groups during which readout pixel signals are accumulated in the photoelectric conversion units 201.

For example, "a" represents a signal accumulated in the photoelectric conversion unit 201 in the first accumulation period group Ta. "b" represents a signal accumulated in the photoelectric conversion unit 201 in the second accumulation period group Tb. "c" represents a signal accumulated in the photoelectric conversion unit 201 in the third accumulation period group Tc. "d" represents a signal accumulated in the photoelectric conversion unit 201 in the fourth accumulation period group Td.

Figure 9:
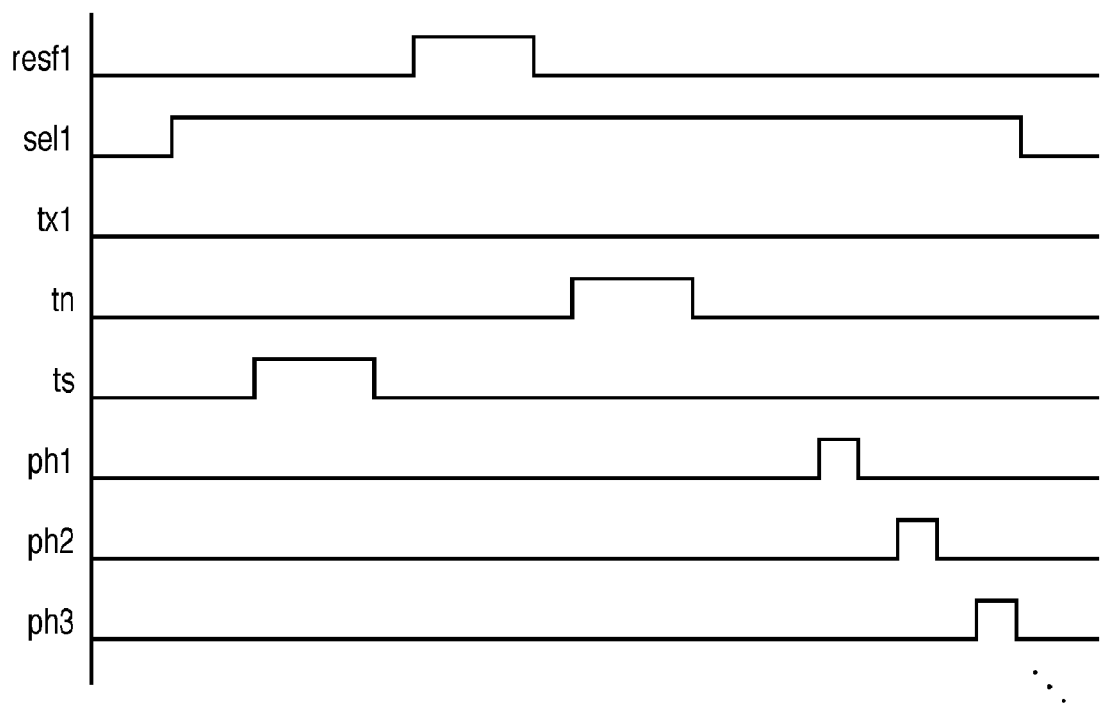
FIG. 9 is a timing chart of the first readout operation.

FIG. 9 is a timing chart of the first readout operation. FIG. 9 exemplifies the readout operation of the first row.

Suffixes 1 to 15 to the horizontal scanning signal name "ph" correspond to pixel columns. For example, "ph1" represents a horizontal transfer signal input to the column readout circuit RC1 of the first column. "ph2" represents a horizontal transfer signal input to the column readout circuit RC2 of the second column. "ph3" represents a horizontal transfer signal input to the column readout circuit RC3 of the third column.

The vertical scanning circuit 401 changes, from a nonactive-level to an active level, the selection control signal "sel1" to be supplied to pixels on the first row. In response to this, the pixels $P_{1,1}$ to $P_{1,25}$ on the first row are selected to output their signals (N and S signals) to the column signal lines RL1 to RL4.

The TG 107 changes, to an active level, the control signal "ts" to be supplied to the S signal transfer switches 302. Then, the S signal transfer switches 302 are turned on to transfer the S signals to the S signal holding capacitances 304. The TG 107 returns, to a nonactive-level, the control signal "ts" to be supplied to the S signal transfer switches 302. The S signal transfer switches 302 are turned off, and the S signal holding capacitances 304 store (hold) the S signals.

The vertical scanning circuit 401 changes, to an active level, the second reset signal "resf1" to be supplied to the pixels on the first row. Then, the second reset units 206 in the pixels on the first row are turned on to reset the charge-voltage converters 204. After that, the vertical scanning circuit 401 returns, to a nonactive-level, the second reset signal "resf1" to be supplied to the pixels on the first row.

The TG 107 changes, to an active level, the control signal "tn" to be supplied to the N signal transfer switches 303. The N signal transfer switches 303 are turned on to transfer the N signals to the N signal holding capacitances 305. The N signal contains the circuit noise component of the charge-voltage converter 204 and subsequent circuits. Thereafter, the TG 107 returns, to a nonactive-level, the control signal "tn" to be supplied to the N signal transfer switches 303. The N signal transfer switches 303 are turned off, and the N signal holding capacitances 305 store (hold) the N signals.

The horizontal transfer signals "ph1" to "ph25" for the respective columns change to an active level in turn to sequentially turn on the horizontal transfer switches of the respective columns. As a result, the S and N signals held in the S and N signal holding capacitances of the respective columns are transferred one by one to the output amplifier 309.

The output amplifier 309 applies a predetermined gain to the difference signal between S and N signals, generating and outputting an image signal free from the circuit noise component.

The vertical scanning circuit 401 changes, from an active level to a nonactive-level, the selection control signal "sel1" to be supplied to the pixels on the first row. The pixels $P_{1,1}$ to $P_{1,25}$ on the first row are then deselected.

In a thinning-out operation 605 indicated by hatched squares in FIG. 6, the column readout circuits RC1 to RC4 (see FIG. 2) do not read out signals from the second pixel group PG2 (see FIG. 5) (readout of signals from the second pixel group PG2 is skipped). More specifically, the vertical scanning circuit 401 sequentially skips the second to fifth rows, seventh to 10th rows, and 12th to 15th rows. The column readout circuits RC1 to RC4 do not read out the signals of pixels on the skipped rows.

Figure 10:
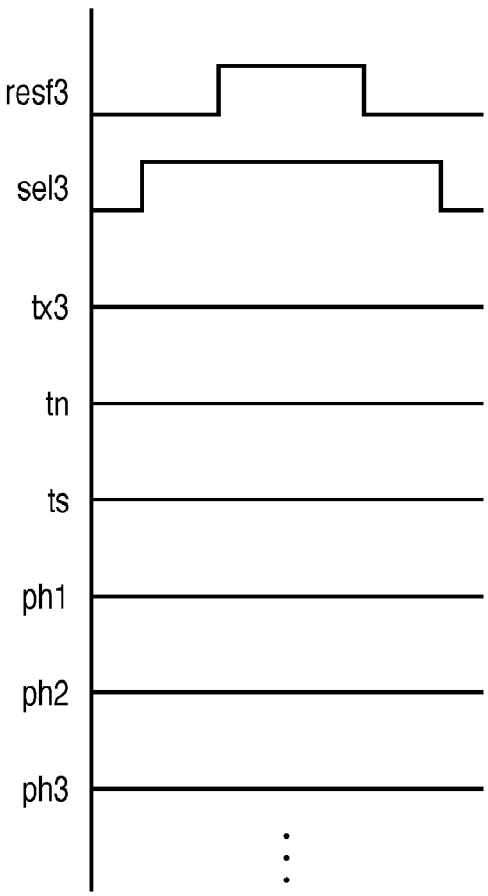
FIG. 10 is a timing chart of a thinning-out operation 605.

FIG. 10 is a timing chart of the thinning-out operation 605. FIG. 10 exemplifies the thinning-out operation 605 of the third row.

The vertical scanning circuit 401 changes, from a nonactive-level to an active level, the selection control signal "sel3" to be supplied to pixels on the third row. In response to this, the pixels $P_{3,1}$ to $P_{3,25}$ on the third row are selected. The output units 205 of the pixels $P_{3,1}$ to $P_{3,25}$ on the third row output signals corresponding to the voltages of the charge-voltage converters 204 to the column signal lines RL1 to RL4. The charge-voltage converters 204 keep holding transferred charges.

The vertical scanning circuit 401 changes, to an active level, the second reset signal "resf3" to be supplied to the pixels on the third row. The second reset units 206 of the pixels on the third row are turned on to reset the charge-voltage converters 204. The vertical scanning circuit 401 returns, to a nonactive-level, the second reset signal "resf3" to be supplied to the pixels on the third row.

The vertical scanning circuit 401 changes, from an active level to a nonactive-level, the selection control signal "sel3" to be supplied to the pixels on the third row. Then, the pixels $P_{3,1}$ to $P_{3,25}$ on the third row are deselected.

In the thinning-out operation, no pixel signal need be read out, so the signals "ts", "tn", and "ph" remain nonactive without changing their level.

In this way, no signal is read out from pixels on a row to be thinned out. The time necessary to thin out one row becomes much shorter than the time taken to read out signals from pixels on one row (see FIG. 6).

Upon receiving a movie shooting instruction, the readout unit 10 (see FIG. 2) reads out a plurality of first signals from the first pixel group PG1 in the pixel array PA in each frame period without reading out a plurality of second signals from the second pixel group PG2 in the pixel array PA. For example, upon receiving a movie shooting instruction, the readout unit 10 (see FIG. 2) reads out a plurality of first signals from all the pixels of the first pixel group PG1 in the pixel array PA in each frame period among a plurality of signals which have been accumulated in the pixel array PA in an accumulation period group in an immediately preceding frame period.

For example, in a first frame period FT1, the readout unit 10 reads out a plurality of first signals from all the pixels of the first pixel group PG1 among a plurality of signals which have been accumulated in the pixel array PA in the first accumulation period group Ta in an immediately preceding frame period FT0. For example, in a second frame period FT2 (frame period subsequent to the first frame period), the readout unit 10 reads out a plurality of first signals from all the pixels of the first pixel group PG1 among a plurality of signals which have been accumulated in the pixel array PA in the second accumulation period group Tb in the immediately preceding frame period FT1.

The readout unit 10 supplies the first signals to the DSP 104 via the output amplifier 309 and AFE 103. The DSP (generation unit) 104 generates image signals (image data) for a movie of one frame from the first signals read out in each frame period. The readout first signals are obtained by thinning out rows of pixels (vertically). If an image is directly generated from the readout first signals, the aspect ratio of the image changes. To prevent this, the DSP 104 interpolates pixel information of thinned-out rows (vertically), and then generates a movie image.

Figure 11:
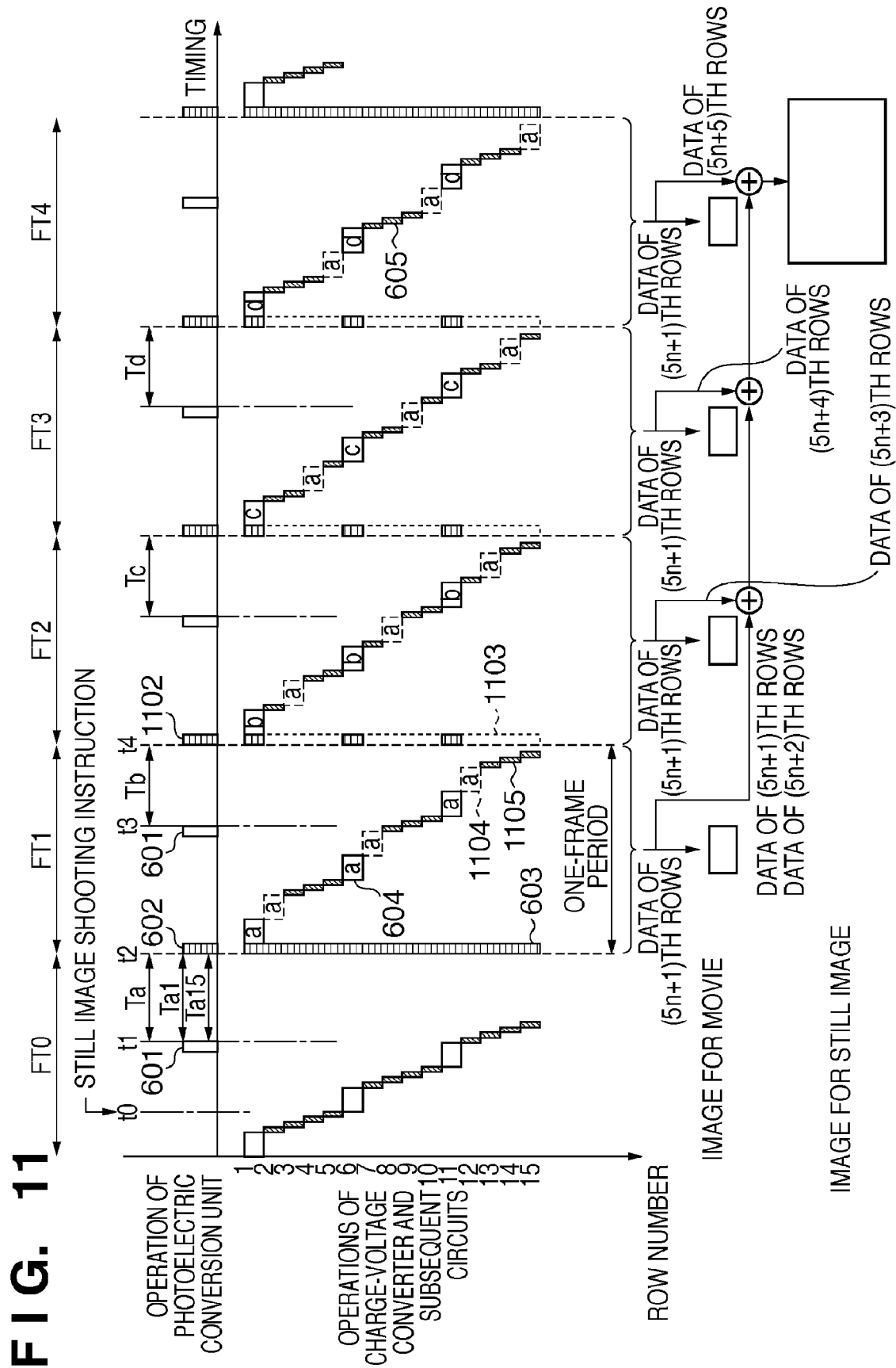
FIG. 11 is a chart schematically showing an operation in the movie/still image parallel shooting mode.

An operation to shoot a still image during movie shooting (movie/still image parallel shooting mode) will be explained mainly with reference to FIG. 11. FIG. 11 is a chart schematically showing an operation in the movie/still image parallel shooting mode. In FIG. 11, the abscissa axis represents the timing. A part of the ordinate axis above the abscissa axis represents the position of a pixel row associated with the operation of the photoelectric conversion unit. A part of the ordinate axis below the abscissa axis represents the position of a pixel row associated with the operations of the charge-voltage converter and subsequent circuits (mainly the operation of the readout unit). A difference from the operation in the movie shooting mode will be mainly described.

Assume that the image sensing apparatus 100 operates in the movie shooting mode immediately before a timing t0.

At the timing t0, the CPU 108 receives a still image shooting instruction from the user via an operation member (not shown) such as a shutter button. In accordance with the instruction, the CPU 108 switches the operation mode from the movie shooting mode to the movie/still image parallel shooting mode.

Figure 12:
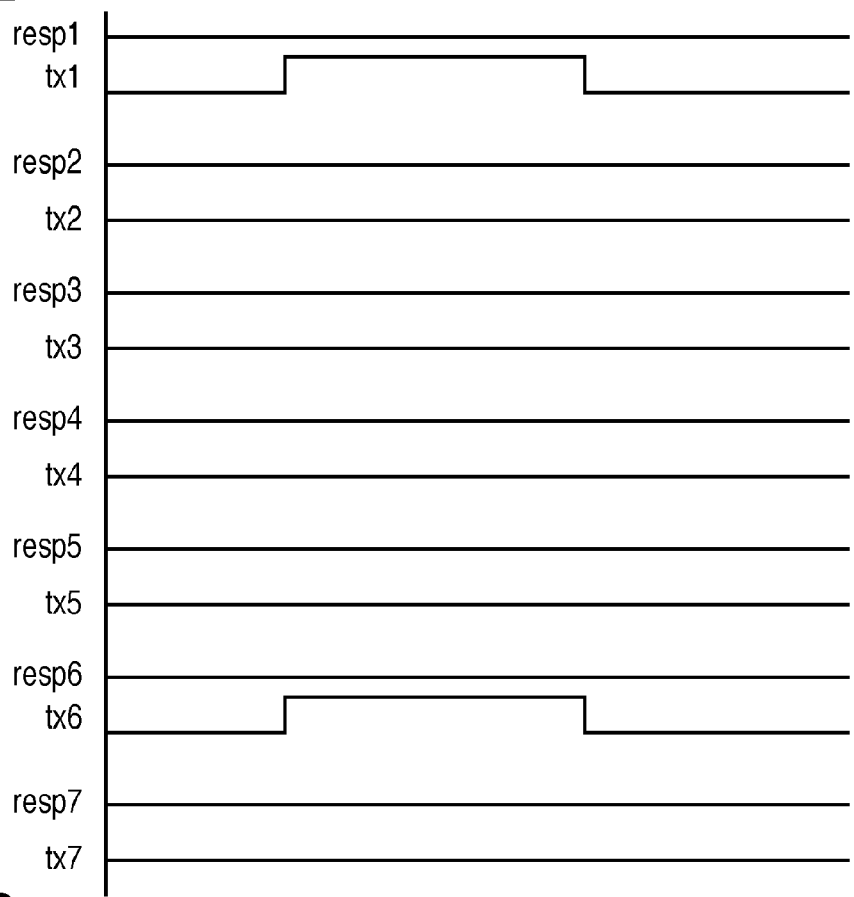
FIG. 12 is a timing chart showing the charge transfer operations of the photoelectric conversion units 201 in pixels on respective rows.

At a timing t2, the transfer operation 602 (or 603) is done on all the rows. To the contrary, at a timing t4, a transfer operation 1102 is done on only some rows. In the transfer operation 1102, the charge transfer operations of the photoelectric conversion units 201 by the transfer units 203 (see FIG. 3) are simultaneously executed in the first pixel group PG1, but are not performed in the second pixel group PG2. In other words, the transfer operation 1102 is not done in the second pixel group PG2, unlike the transfer operation 602. This will be explained with reference to the timing chart of FIG. 12. FIG. 12 is a timing chart showing the charge transfer operations of the photoelectric conversion units 201 in pixels on respective rows. FIG. 12 exemplifies signals supplied to pixels on the first to seventh rows.

The vertical scanning circuit 401 supplies the transfer control signals "tx1" to "tx15" to the pixels on the respective rows, as shown in FIG. 12. More specifically, the transfer control signals "tx1", "tx6", and "tx11" change from a nonactive-level to an active level at once, while the transfer control signals "tx2" to "tx5", "tx7" to "tx10", and "tx12" to "tx15" remain nonactive. Then, the transfer units 203 in the pixels of the first pixel group PG1 transfer charges in the photoelectric conversion units 201 to the charge-voltage converters 204. The charge-voltage converters 204 in the pixels of the second pixel group PG2 keep holding charges (signals) accumulated in the first accumulation period group Ta.

In a second readout operation 1104 indicated by blank squares of broken lines in FIG. 11, the column readout circuits RC1 to RC4 (see FIG. 2) read out signals even from some regions of the second pixel group PG2 (FIG. 5) that change between frame periods.

More specifically, in the first frame period FT1, the vertical scanning circuit 401 sequentially selects pixels on the (5n+2)th (second, seventh, and 12th) rows from the second pixel group PG2. The column readout circuits RC1 to RC4 read out the signals (second signals among a plurality of signals which have been accumulated in the pixel array PA in the first accumulation period group Ta) of the pixels on the sequentially selected rows.

In the second frame period FT2, the vertical scanning circuit 401 sequentially selects pixels on the (5n+3)th (third, eighth, and 13th) rows from the second pixel group PG2. The column readout circuits RC1 to RC4 read out the signals (second signals among a plurality of signals which have been accumulated in the pixel array PA in the first accumulation period group Ta) of the pixels on the sequentially selected rows.

In a third frame period FT3, the vertical scanning circuit 401 sequentially selects pixels on the (5n+4)th (fourth, ninth, and 14th) rows from the second pixel group PG2. The column readout circuits RC1 to RC4 read out the signals (second signals among a plurality of signals which have been accumulated in the pixel array PA in the first accumulation period group Ta) of the pixels on the sequentially selected rows.

In a fourth frame period FT4, the vertical scanning circuit 401 sequentially selects pixels on the (5n+5)th (fifth, 10th, and 15th) rows from the second pixel group PG2. The column readout circuits RC1 to RC4 read out the signals (second signals among a plurality of signals which have been accumulated in the pixel array PA in the first accumulation period group Ta) of the pixels on the sequentially selected rows.

As described above, in the successive frame periods FT1 to FT4, the column readout circuits RC1 to RC4 read out a plurality of second signals from some regions of the second pixel group PG2 that change between frame periods (e.g., rows which change between frame periods) among a plurality of signals which have been accumulated in the pixel array PA in the first accumulation period group Ta.

A timing chart associated with the second readout operation 1104 is the same as FIG. 9.

In a thinning-out operation 1105 indicated by hatched squares in FIG. 11, the number of rows (three out of five rows) not to undergo a readout operation in the second pixel group PG2 (see FIG. 5) is smaller than that (four out of five rows) not to undergo a readout operation in the thinning-out operation 605 shown in FIG. 6.

Figure 13:
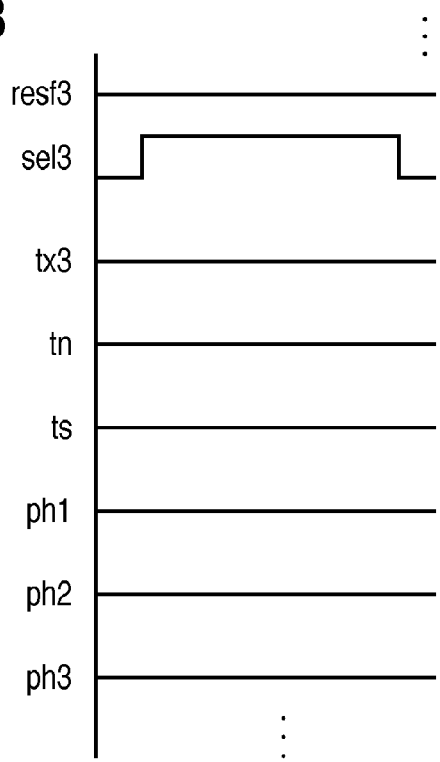
FIG. 13 is a timing chart of a thinning-out operation 1105.

FIG. 13 is a timing chart of the thinning-out operation 1105. FIG. 13 exemplifies the thinning-out operation 1105 of the third row.

The vertical scanning circuit 401 changes, from a nonactive-level to an active level, the selection control signal "sel3" to be supplied from pixels on the third row. The pixels $P_{3,1}$ to $P_{3,25}$ on the third row are then selected. The output units 205 of the pixels $P_{3,1}$ to $P_{3,25}$ on the third row output signals corresponding to the voltages of the charge-voltage converters 204 to the column signal lines RL1 to RL4. The charge-voltage converters 204 hold charges (signals) accumulated in the first accumulation period group Ta.

The vertical scanning circuit 401 maintains, at a nonactive-level, the second reset signal "resf3" to be supplied to the pixels on the third row. Hence, the charge-voltage converters 204 are not reset and keep holding charges (signals) accumulated in the first accumulation period group Ta.

At a timing t3 in the first frame period FT1 shown in FIG. 11, the reset operation 601 is simultaneously completed in all the pixels $P_{1,1}$ to $P_{15,25}$. At this time, the transfer units 203 (see FIG. 3) in all the pixels are OFF, so the reset operation 601 does not affect charges held in the charge-voltage converters 204.

In this manner, in each of successive frame periods starting from the first frame period, the readout unit 10 (see FIG. 2) reads out, from some regions of the second pixel group PG2 that change between frame periods, a plurality of second signals among a plurality of signals which have been accumulated in the pixel array PA in the first accumulation period group Ta. That is, the readout unit 10 executes the signal readout operations of all the pixels in the second pixel group PG2 (divisionally) in a plurality of successive frame periods starting from the first frame period.

For example, in the first frame period FT1, the readout unit 10 reads out a plurality of second signals from the pixels on the (5n+2)th (second, seventh, and 12th) rows in the second pixel group PG2 among a plurality of signals which have been accumulated in the pixel array PA in the first accumulation period group Ta.

For example, in the second frame period FT2, the readout unit 10 reads out a plurality of second signals from the pixels on the (5n+3)th (third, eighth, and 13th) rows in the second pixel group PG2 among a plurality of signals which have been accumulated in the pixel array PA in the first accumulation period group Ta.

For example, in the third frame period FT3, the readout unit 10 reads out a plurality of second signals from the pixels on the (5n+4)th (fourth, ninth, and 14th) rows in the second pixel group PG2 among a plurality of signals which have been accumulated in the pixel array PA in the first accumulation period group Ta.

For example, in the fourth frame period FT4, the readout unit 10 reads out a plurality of second signals from the pixels on the (5n+5)th (fifth, 10th, and 15th) rows in the second pixel group PG2 among a plurality of signals which have been accumulated in the pixel array PA in the first accumulation period group Ta.

The readout unit 10 supplies the second signals to the DSP 104 via the output amplifier 309 and AFE 103. The DSP (generation unit) 104 composes the first signals read out by the readout unit 10 in the first frame period FT1 and the second signals read out by the readout unit 10 over the frame periods FT1 to FT4. As a result, the DSP 104 generates image signals for a still image of one frame.

While suppressing prolongation of the frame periods FT0 to FT4, the image sensing apparatus can generate image signals (image data) for a still image of one frame using the signals of all the pixels $P_{1,1}$ to $P_{15,25}$ that have been accumulated in the first accumulation period group Ta. The image sensing apparatus can therefore generate a still image with high spatial resolution that improves the simultaneity of accumulation while suppressing a decrease in frame rate. Even when shooting a movie of a moving object parallel to still image shooting (movie/still image parallel shooting mode), the image sensing apparatus can shoot a still image as high in quality as a still image shot without shooting a movie (still image shooting mode).

Note that signals may also be read out from the pixel array PA of the image sensor 102 while thinning out signals for each column.

An image sensing apparatus according to the second embodiment of the present invention will be explained. A difference from the first embodiment will be mainly described.

Figure 14:
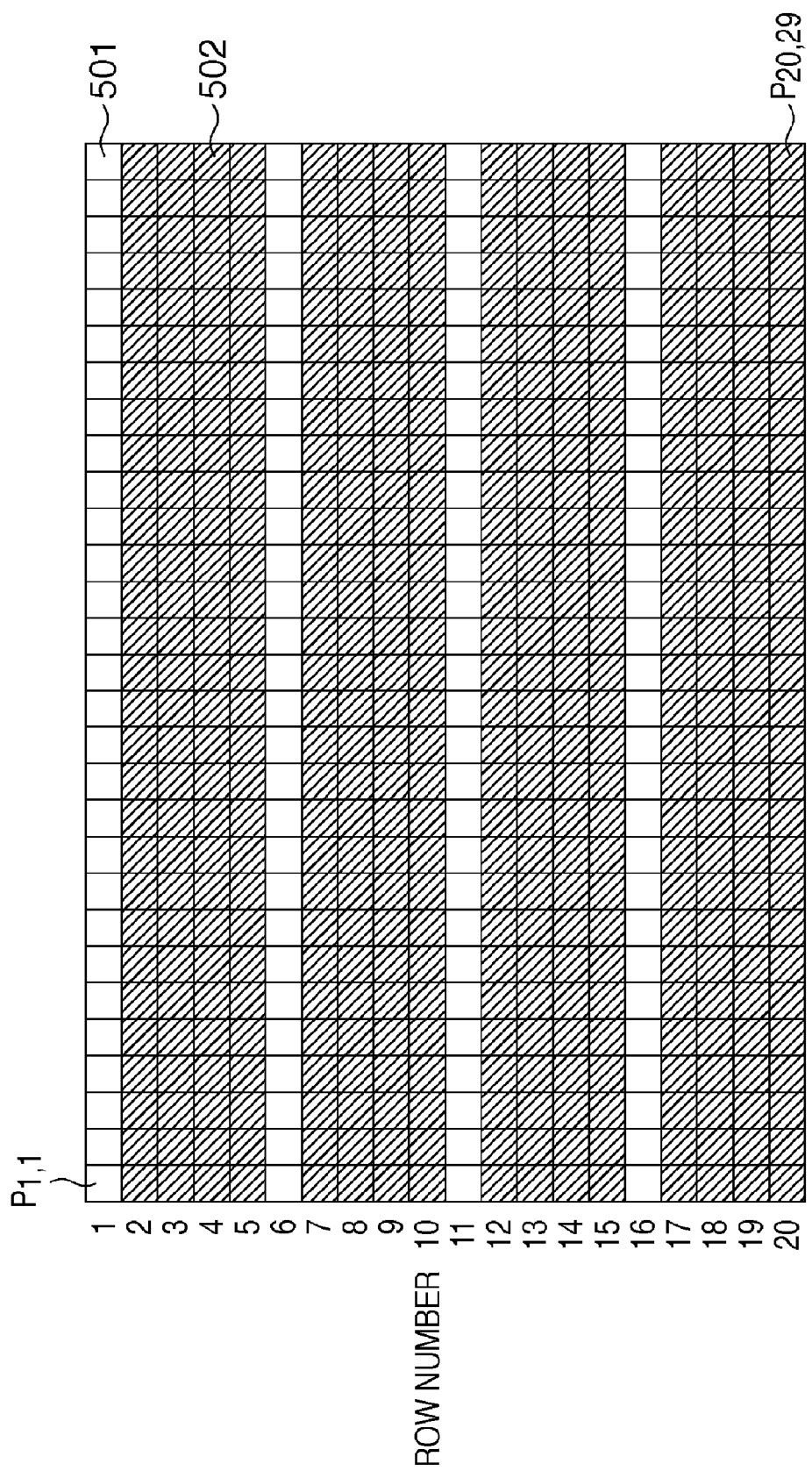
FIG. 14 is a view showing a pixel array PA made up of 20×29 pixels $P_{1,1}$ to $P_{20,29}$ in the second embodiment of the present invention.

The image sensing apparatus according to the second embodiment has basically the same arrangement as that in the first embodiment, but is different in operation from that in the first embodiment. The second embodiment will explain the operation of the image sensing apparatus using a pixel array PA made up of 20×29 pixels $P_{1,1}$ to $P_{20,29}$. FIG. 14 is a view showing the pixel array PA made up of 20×29 pixels $P_{1,1}$ to $P_{20,29}$.

More specifically, when changing the operation mode from the movie shooting mode to the movie/still image parallel shooting mode, the image sensing apparatus decreases the ratio of the number of pixels of a first pixel group PG1 to the number of a second pixel group PG2 from a ratio in the movie shooting mode.

Figure 15:
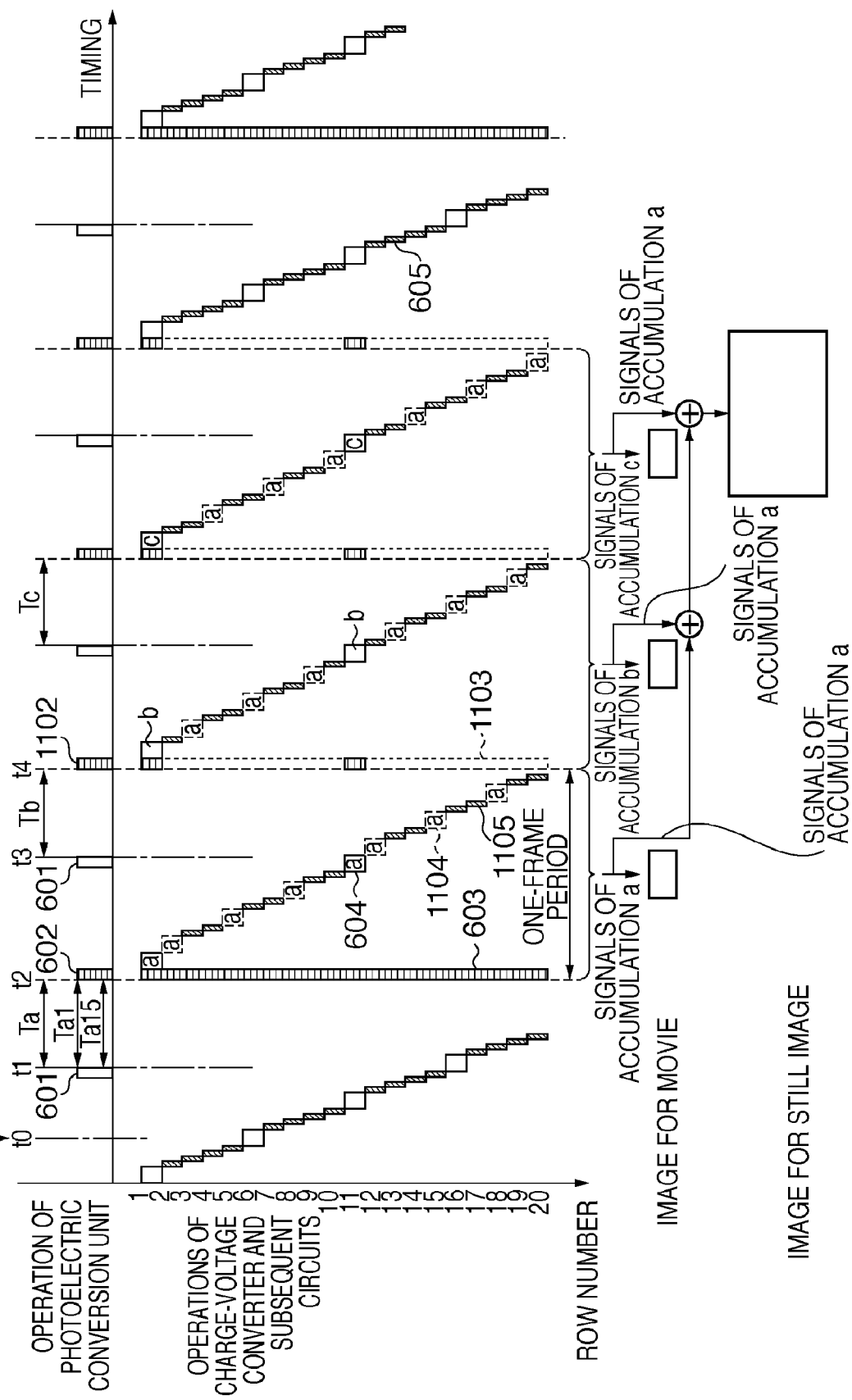
FIG. 15 is a chart schematically showing an operation in the movie/still image parallel shooting mode in the second embodiment of the present invention.

For example, when the operation mode switches from the movie shooting mode to the movie/still image parallel shooting mode, the image sensing apparatus decreases the ratio of the number of pixels of the first pixel group PG1 to the number of the second pixel group PG2 from 1/5 to 1/10, as shown in FIG. 15. More specifically, in the movie shooting mode, a readout unit 10 of an image sensor 102 reads out first signals as signals for a movie from pixels on the first, sixth, 11th, and 16th rows at the ratio of 1/5. When the operation mode switches from the movie shooting mode to the movie/still image parallel shooting mode, the readout unit 10 decreases the ratio from 1/5 to 1/10, and reads out first signals as signals for a movie from pixels on the first and 11th rows. FIG. 15 is a chart schematically showing an operation at a decreased ratio of the number of pixels of the first pixel group to that of the second pixel group in the movie/still image parallel shooting mode.

At a decreased ratio of the number of pixels of the first pixel group PG1 to the number of the second pixel group PG2, the readout unit 10 increases the number of pixels for reading out signals from the second pixel group PG2 in each of the frame periods FT1 to FT4, compared to the number of pixels at the original ratio. This can shorten the time until the signals of all pixels used to generate a still image are read out.

Figure 16:
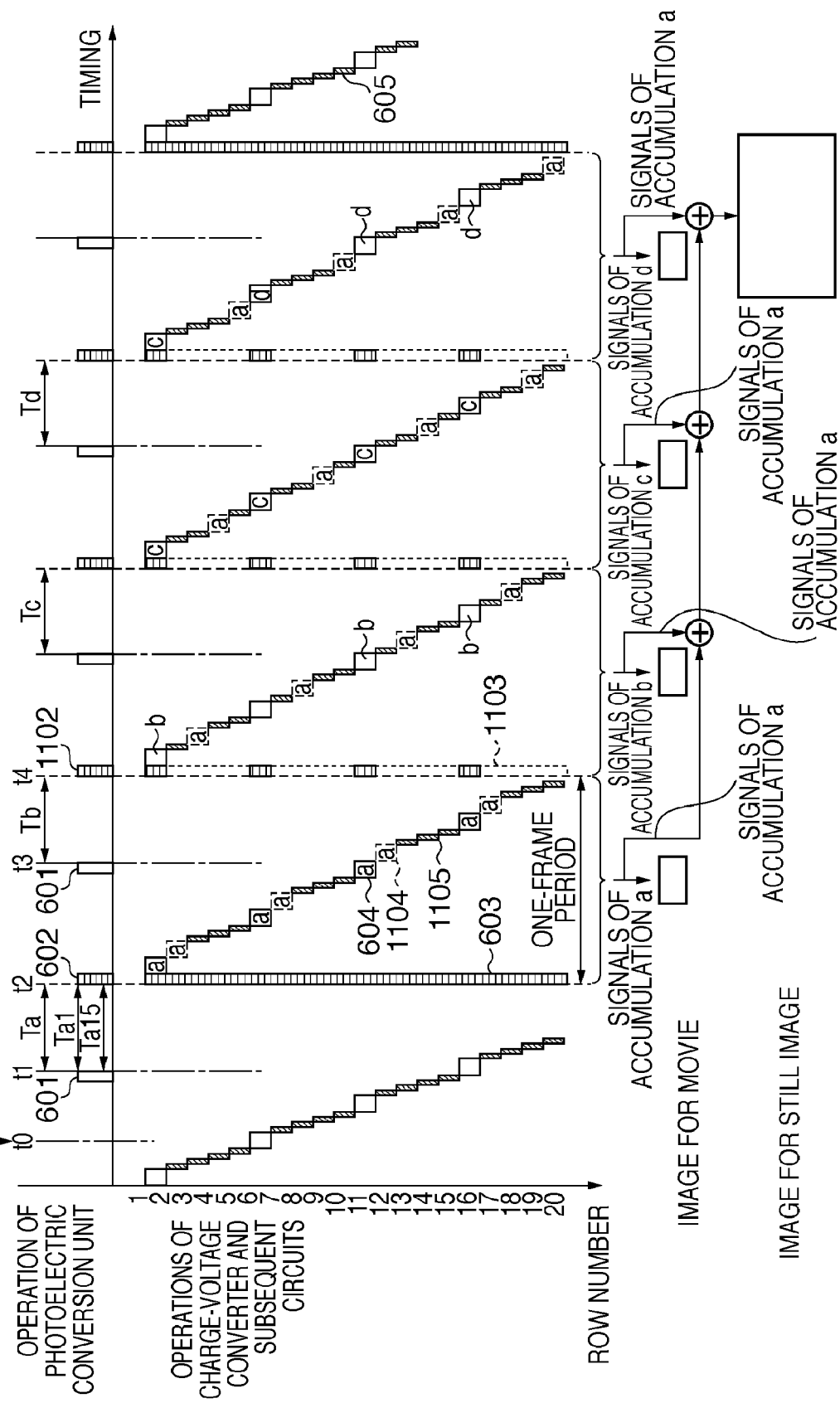
FIG. 16 is a chart schematically showing an operation in the movie/still image parallel shooting mode in the second embodiment of the present invention.

For example, if the ratio remains 1/5, as shown in FIG. 16, the readout unit 10 reads out second signals from pixels on four rows in the second pixel group PG2 in each of the frame periods FT1 to FT4. In this case, the signals of all pixels used to generate a still image can be acquired in four frame periods.

To the contrary, for example, when the ratio decreases from 1/5 to 1/10, as shown in FIG. 15, the readout unit 10 reads out second signals from pixels on six rows in the second pixel group PG2 in each of the frame periods FT1 to FT4. In this case, the signals of all pixels used to generate a still image can be acquired in three frame periods. That is, the time (three frame periods) until the signals of all pixels used to generate a still image are read out at a ratio decreased from 1/5 to 1/10 can be easily shortened from the time (four frame periods) until the signals of all pixels used to generate a still image are read out at the original ratio. FIG. 16 is a chart schematically showing an operation at the original ratio of the number of pixels of the first pixel group to the number of the second pixel group in the movie/still image parallel shooting mode. The operation shown in FIG. 16 is the same as that shown in FIG. 11 except for the number of rows shown in FIG. 16.

When still image shooting ends and the shooting mode returns to the movie shooting mode again, the number of pixel rows used for a movie returns to the original one. Even the spatial resolution of the movie can be restored again.

An image sensing apparatus according to the third embodiment of the present invention will be explained. A difference from the first embodiment will be mainly described.

The image sensing apparatus according to the third embodiment of the present invention employs a slit rolling electronic shutter function as an electronic shutter function. An image sensing apparatus 100 includes the following constituent elements.

Figure 17:
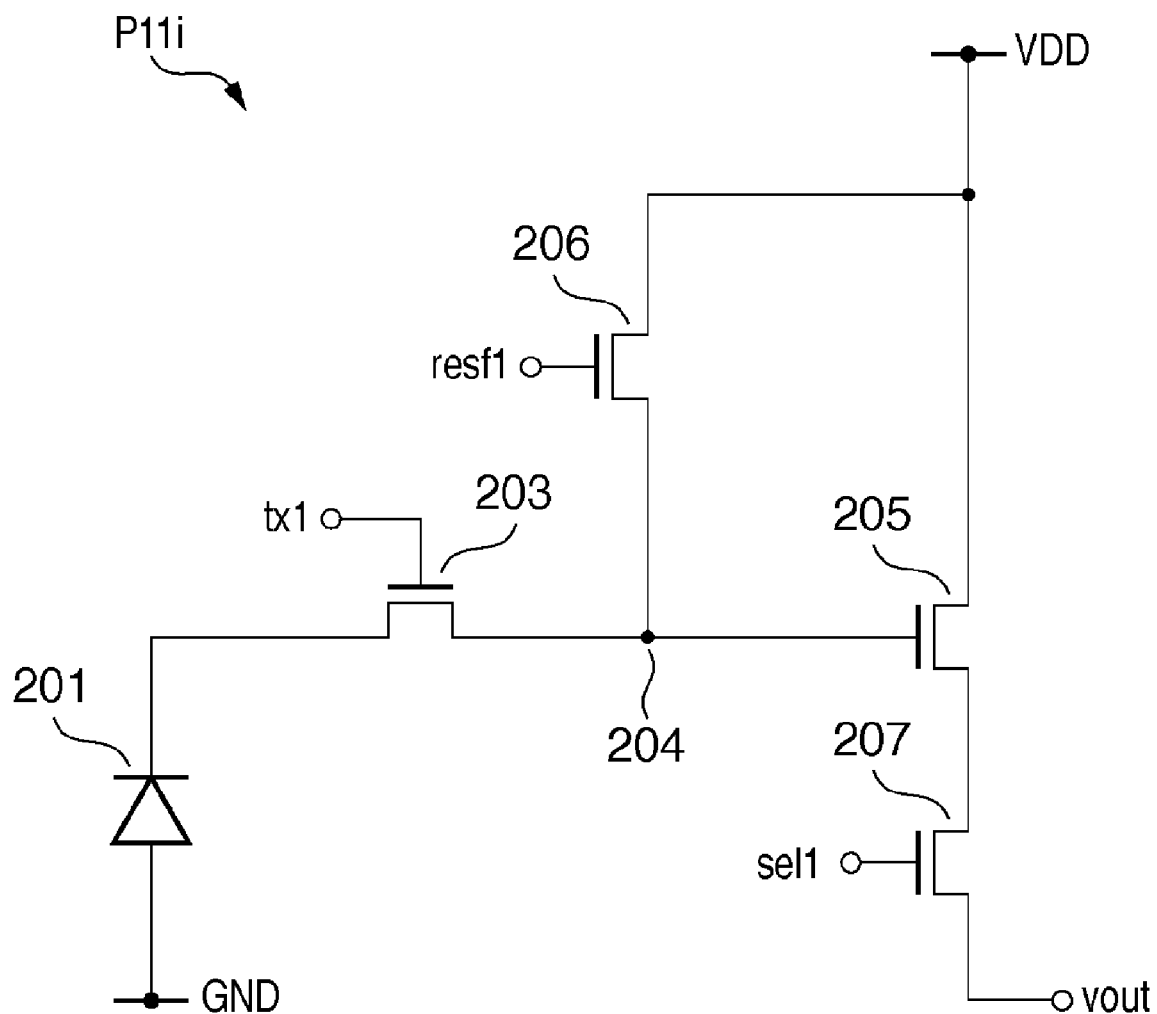
FIG. 17 is a circuit diagram of the structure of a pixel P11$i$ in an image sensing apparatus according to the third embodiment of the present invention.

As shown in FIG. 17, each of pixels P11$i$ to P44$i$ in a pixel array PA of an image sensor 102 does not include the first reset unit 202. FIG. 17 is a circuit diagram of the structure of the pixel P11$i$ in the image sensing apparatus according to the third embodiment of the present invention.

When resetting a photoelectric conversion unit 201 in the pixel P11$i$, both signals "tx1" and "resf1" change to an active level at once to turn on both a transfer unit 203 and second reset unit 206. Then, both of remaining charges in the photoelectric conversion unit 201 and remaining charges in the charge-voltage conversion converter 204 are exhausted to the power supply via the transfer unit 203 and second reset unit 206. FIG. 17 is a circuit diagram of the structure of the pixel in the image sensing apparatus according to the third embodiment of the present invention. FIG. 17 exemplifies the structure of the pixel P11$i$. The remaining pixels P12$i$ to P44$i$ also have the same structure as that of the pixel P11$i$.

Figure 18:
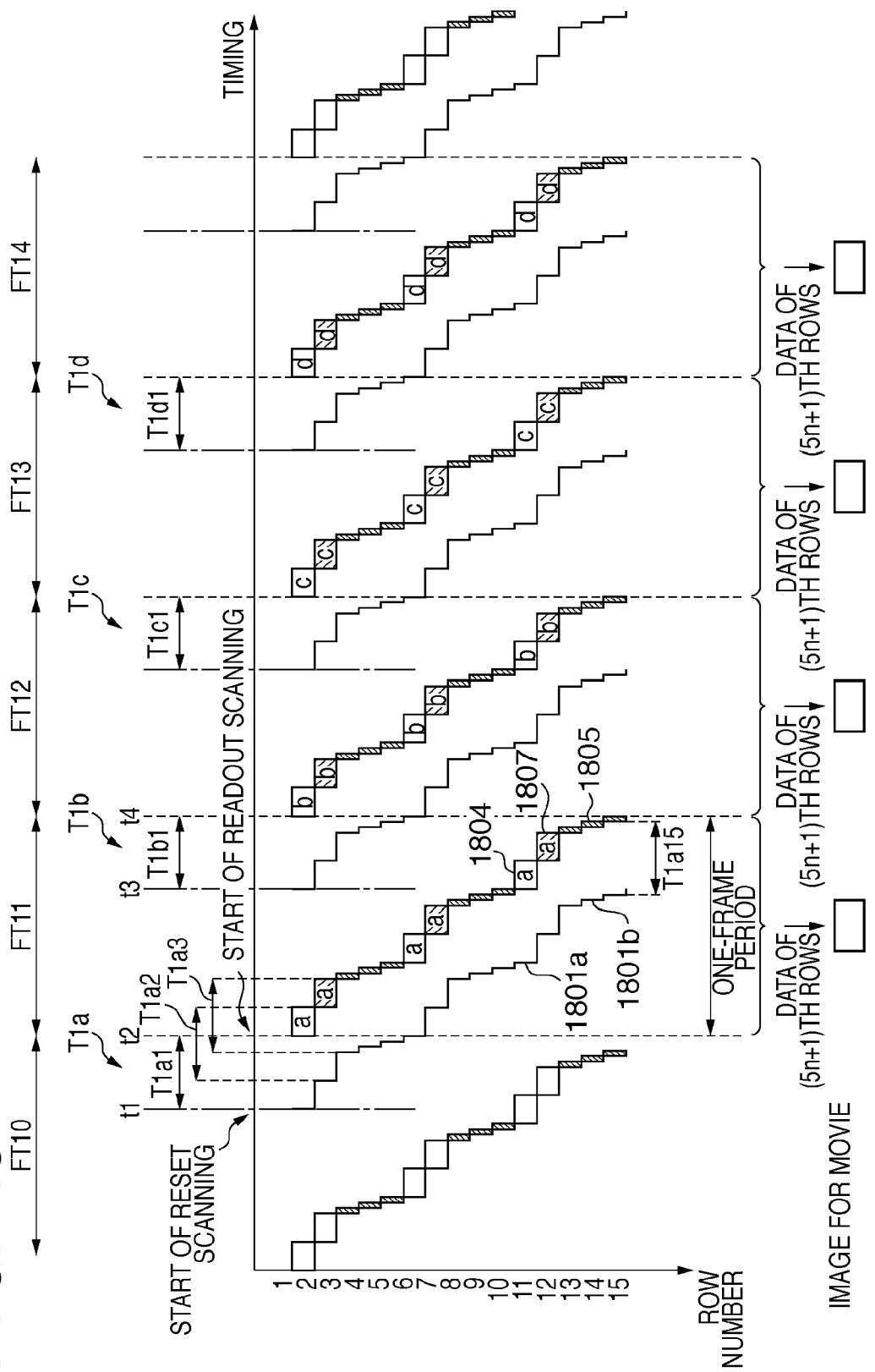
FIG. 18 is a chart schematically showing an operation in the movie shooting mode in the third embodiment of the present invention.

FIG. 18 is a chart schematically showing an operation in the movie shooting mode in the third embodiment. The abscissa axis represents the timing, and the ordinate axis represents the position of a pixel row. The slit rolling electronic shutter shown in FIG. 18 resets the photoelectric conversion units 201 sequentially for respective rows. FIG. 18 shows the operation of the photoelectric conversion unit and that of the readout circuit subsequent to the charge-voltage converter without dividing them.

A vertical scanning circuit 401 executes "reset scanning" to sequentially complete the reset operations of the photoelectric conversion units 201 in pixels on the respective rows of the pixel array PA. The photoelectric conversion units 201 in the pixels on the respective rows sequentially start a charge accumulation operation. In FIG. 18, the timing when reset scanning of each row is completed is indicated by a solid line, and the timing to start reset scanning of each row is not shown for convenience.

Then, the vertical scanning circuit 401 performs "readout scanning" to sequentially start reading out charges accumulated in the photoelectric conversion units 201 for respective pixel rows with a delay of the accumulation period from the completion of reset scanning of each row. The photoelectric conversion units 201 in the pixels on the respective rows sequentially end the charge accumulation operation.

In FIG. 18, a timing t1 is the reset scanning completion timing of the first row, and a timing t2 is the readout scanning start timing of the first row. The time interval between the timings t1 and t2 serves as a first accumulation period T1a1 of pixels on the first row. The time interval between timings delayed from the timings t1 and t2 by a predetermined time serves as a first accumulation period T1a2. Similarly, first accumulation periods T1a3 to T1a15 for the remaining, third to 15th rows are defined by timings delayed from the reset scanning completion timing and readout scanning start timing of immediately preceding rows by a predetermined time.

As shown in FIG. 18, a plurality of pixels $P_{1,1}$ to $P_{15,25}$ execute a charge accumulation operation in a first accumulation period group T1a. The first accumulation period group T1a is a group of the first accumulation periods T1a1 to T1a15 which partially overlap each other between at least two adjacent rows.

As shown in FIG. 18, the completion timings of reset operations 1801a and 1801b are delayed from the reset operation completion timings of immediately preceding rows by the time taken for a first readout operation 1804 or thinning-out operation 1805 of the immediately preceding rows. For example, the completion timing of the reset operation 1801a of the sixth row is delayed from that of the reset operation 1801b of the fifth row by the time taken for the thinning-out operation 1805. For example, the completion timing of the reset operation 1801a of the seventh row is delayed from that of the reset operation 1801a of the sixth row by the time taken for the first readout operation 1804. As a result, the durations of the first accumulation periods T1a1 to T1a15 in the first accumulation period group T1a become equal to each other. The reset operation 1801a targets a row to undergo the first readout operation 1804. The reset operation 1801b targets a row to undergo the thinning-out operation 1805.

Figure 21:
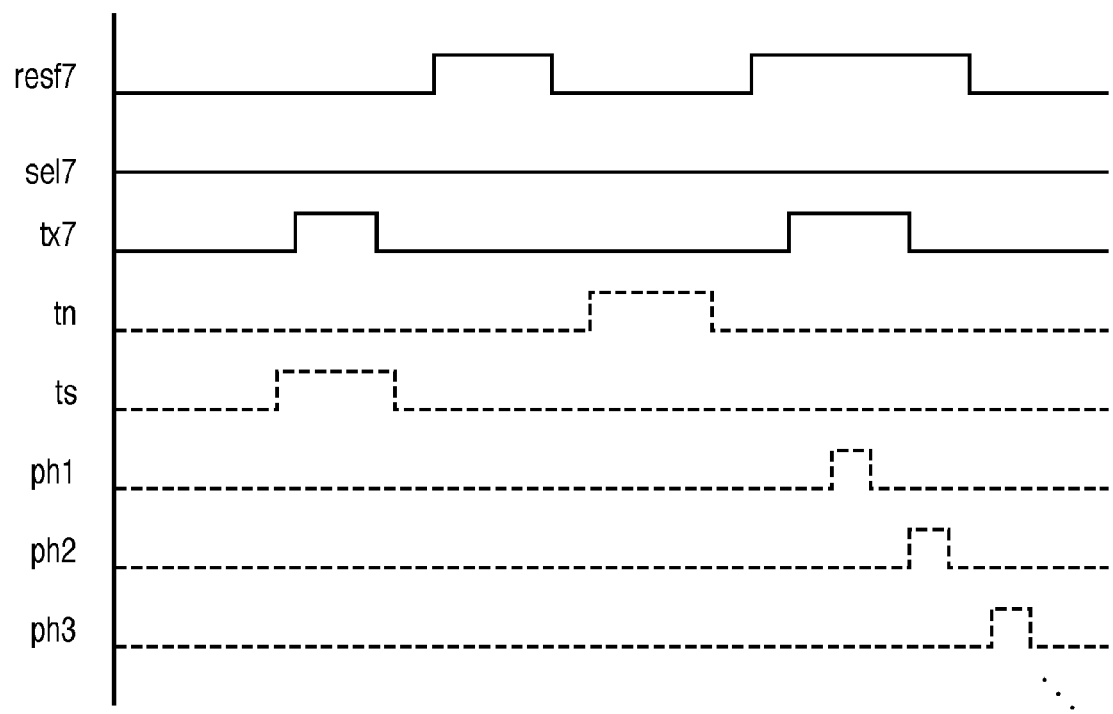
FIG. 21 is a timing chart of a reset operation 1801$a$.

FIG. 21 is a timing chart of the reset operation 1801a. FIG. 21 exemplifies the reset operation 1801a of the seventh row.

The vertical scanning circuit 401 changes, to an active level, a transfer control signal "tx7" to be supplied to pixels on the seventh row. Then, the transfer units 203 in the pixels on the seventh row transfer charges in the photoelectric conversion units 201 to charge-voltage converters 204.

After that, the vertical scanning circuit 401 changes, to an active level, a second reset control signal "resf7" to be supplied to the pixels on the seventh row. The second reset units 206 in the pixels on the seventh row reset the charge-voltage converters 204.

The vertical scanning circuit 401 changes, to an active level, the second reset control signal "resf7" and transfer control signal "tx7" to be supplied to the pixels on the seventh row. Then, the photoelectric conversion units 201 in the pixels on the seventh row are reset.

The reset operation 1801a of the seventh row is done parallel to the first readout operation 1804 of the first row (as represented by waveforms of broken lines in FIG. 21) (see also FIG. 18).

Figure 22:
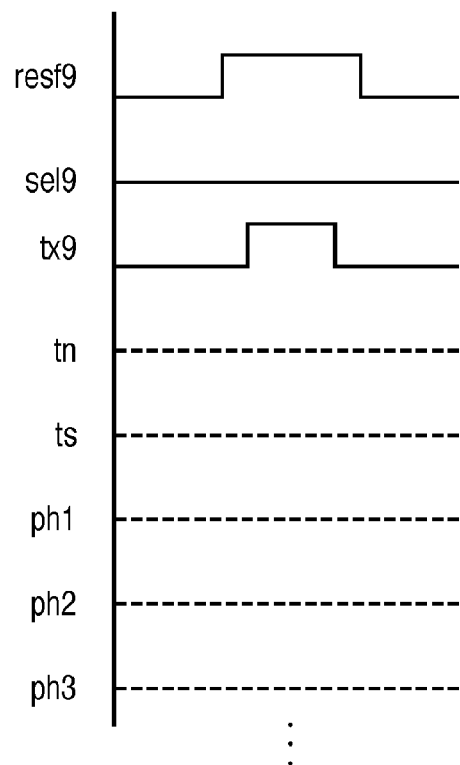
FIG. 22 is a timing chart of a reset operation 1801$b$.

FIG. 22 is a timing chart of the reset operation 1801b. FIG. 22 exemplifies the reset operation 1801b of the ninth row.

The vertical scanning circuit 401 changes, to an active level, a second reset control signal "resf9" and transfer control signal "tx9" to be supplied to pixels on the ninth row. In response to this, the photoelectric conversion units 201 in the pixels on the ninth row are reset. The vertical scanning circuit 401 maintains, at a nonactive-level, a selection control signal "sel9" to be supplied to the pixels on the ninth row. The pixels on the ninth row remain deselected not to output their signals.

The reset operation 1801b of the ninth row is executed parallel to the thinning-out operation 1805 of the third row (as represented by waveforms of broken lines in FIG. 22) (see also FIG. 18).

In the second readout operation 1804 indicated by blank squares in FIG. 18, column readout circuits RC1 to RC4 (see FIG. 2) read out signals from a first pixel group PG1 (see FIG. 5) sequentially for respective rows. More specifically, the vertical scanning circuit 401 sequentially selects the first, sixth, and 11th rows from the first pixel group PG1. The column readout circuits RC1 to RC4 read out the signals of pixels on the sequentially selected rows.

Figure 19:
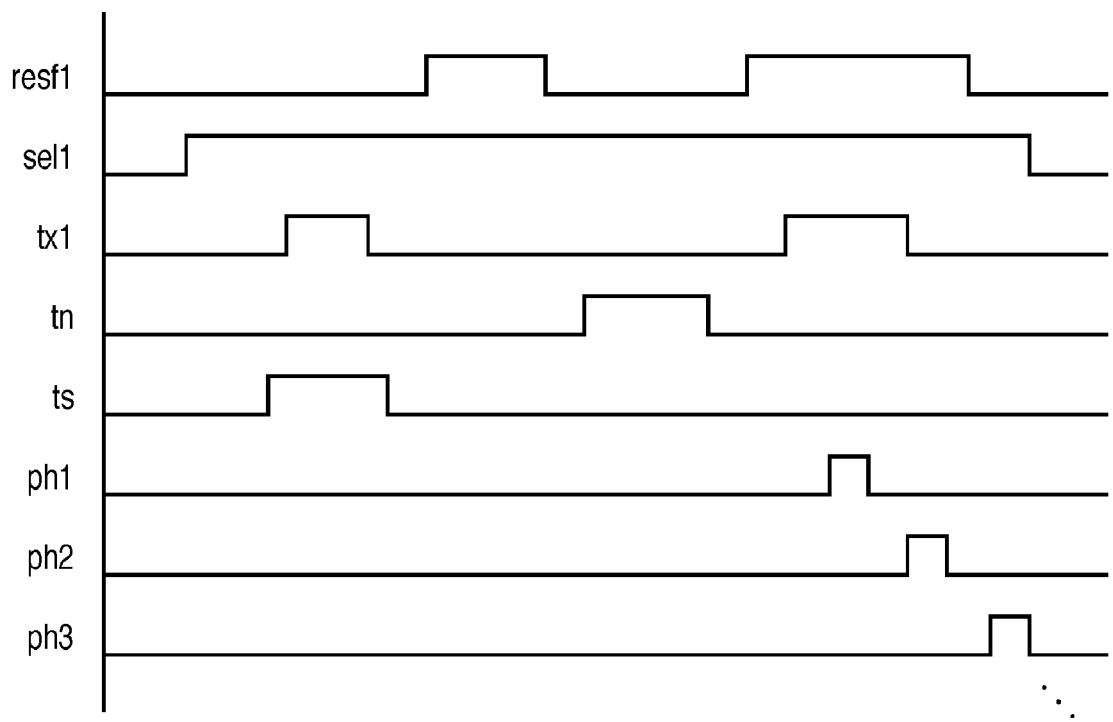
FIG. 19 is a timing chart of the first readout operation.

FIG. 19 is a timing chart of the first readout operation. FIG. 19 exemplifies the readout operation of the first row. The first readout operation in the third embodiment is different from that in the first embodiment in the following point.

A TG 107 changes, to an active level, a control signal "ts" to be supplied to S signal transfer switches 302. Then, the S signal transfer switches 302 are turned on. While maintaining the control signal "ts" at an active level, the vertical scanning circuit 401 changes, to an active level, the transfer control signal "tx1" to be supplied to pixels on the first row. The transfer units 203 in the pixels on the first row transfer charges in the photoelectric conversion units 201 to the charge-voltage converters 204. Output units 205 output S signals corresponding to the voltages of the charge-voltage converters 204 to column signal lines RL1 to RL4. The S signal transfer switches 302 transfer the S signals passing through the column signal lines RL1 to RL4 to S signal holding capacitances 304. After the S signal transfer switches 302 are turned off, the S signal holding capacitances 304 store (hold) the transferred S signals.

While horizontal transfer signals "ph1" to "ph25" for respective columns sequentially change to an active level (horizontal transfer period of signals on the first row), the vertical scanning circuit 401 changes, to an active level, the second reset control signal "resf1" and transfer control signal "tx1" to be supplied to the pixels on the first row. Then, the photoelectric conversion units 201 in the pixels on the first row are reset. The vertical scanning circuit 401 changes the second reset control signal "resf1" and transfer control signal "tx1" to a nonactive-level.

In a third readout operation 1807 indicated by wide hatched squares in FIG. 18, dummy signals are read out from some regions of the second pixel group PG2 (FIG. 5). More specifically, the vertical scanning circuit 401 sequentially selects the second, seventh, and 12th rows from the second pixel group PG2. The column readout circuits RC1 to RC4 read out the dummy signals of pixels on the sequentially selected rows.

Only in movie shooting, it suffices to read out the signals of the first pixel group PG1 used for a movie, and the signals of some regions (second, seventh, and 12th rows) of the second pixel group PG2 need not be read out. Even in movie shooting, however, signals need to be read out even from some regions of the second pixel group PG2 not used for a movie in order to make the operation period in the movie shooting mode equal to that in the movie/still image parallel shooting mode to be described later (make times taken for slit rolling shutter operations equal to each other).

In the thinning-out operation 1805 indicated by hatched squares in FIG. 18, the column readout circuits RC1 to RC4 (see FIG. 2) do not read out signals from the remaining rows of the second pixel group PG2 (see FIG. 5) (do not read out even dummy signals). More specifically, the vertical scanning circuit 401 sequentially skips the third to fifth rows, eighth to 10th rows, and 13th to 15th rows. The column readout circuits RC1 to RC4 do not read out the signals of pixels on the skipped rows.

Figure 20:
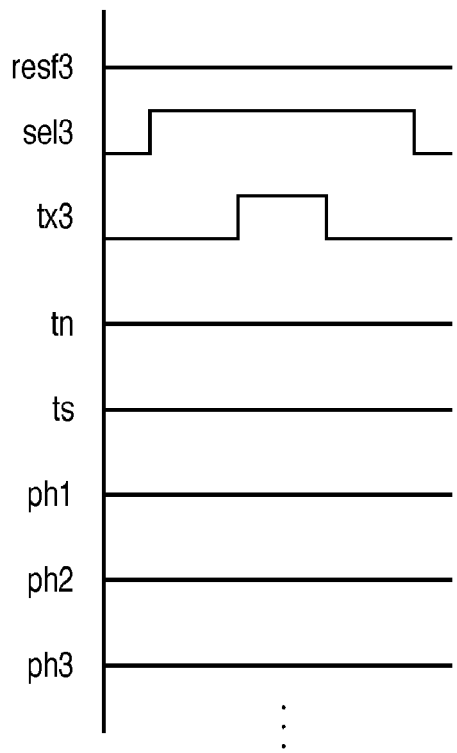
FIG. 20 is a timing chart of a thinning-out operation 1805.

FIG. 20 is a timing chart of the thinning-out operation 1805. FIG. 20 exemplifies the thinning-out operation 1805 of the third row.

The vertical scanning circuit 401 changes, from a nonactive-level to an active level, a selection control signal "sel3" to be supplied to pixels on the third row, thereby selecting the pixels $P_{3,1}$ to $P_{3,25}$ on the third row.

The vertical scanning circuit 401 changes, to an active level, a transfer control signal "tx3" to be supplied to the pixels on the third row. In response to this, the transfer units 203 in the pixels on the third row transfer charges in the photoelectric conversion units 201 to the charge-voltage converters 204. The charge-voltage converters 204 hold charges (signals) accumulated in the first accumulation period $T1a3$.

The vertical scanning circuit 401 changes, from an active level to a nonactive-level, the selection control signal "sel3" to be supplied to the pixels on the third row, thereby deselecting the pixels $P_{3,1}$ to $P_{3,25}$ on the third row.

In the thinning-out operation, no pixel signal need be read out, so the signals "ts", "tn", and "ph" remain nonactive without changing their level.

Since no signal is read out from pixels, the time necessary to thin out one row becomes much shorter than the time taken to read out signals from pixels on one row (see FIG. 18).

The remaining operation is the same as that in the movie shooting mode in the first embodiment.

Figure 23:
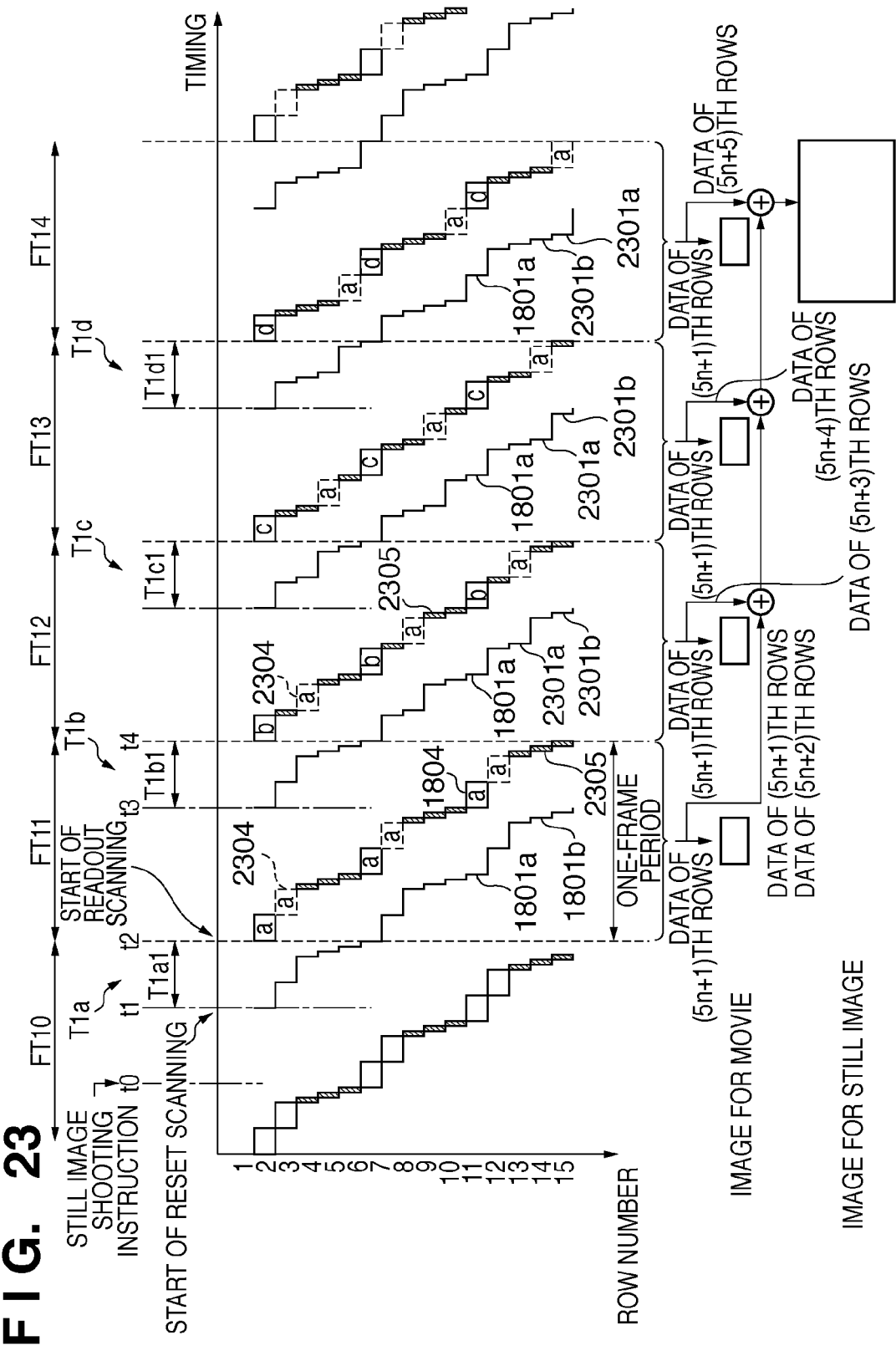
FIG. 23 is a chart schematically showing an operation in the movie/still image parallel shooting mode in the third embodiment of the present invention.

An operation in the movie/still image parallel shooting mode will be explained mainly with reference to FIG. 23. FIG. 23 is a chart schematically showing an operation in the movie/still image parallel shooting mode. A difference from the operation in the movie shooting mode will be mainly explained.

In the movie/still image parallel shooting mode, reset operations 2301a and 2301b different from those in the movie shooting mode are done in frame periods FT12 to FT14. The reset operation 2301a targets a row to undergo a second readout operation 2304 (to be described later). The reset operation 2301b targets a row to undergo a thinning-out operation 2305.

Figure 24:
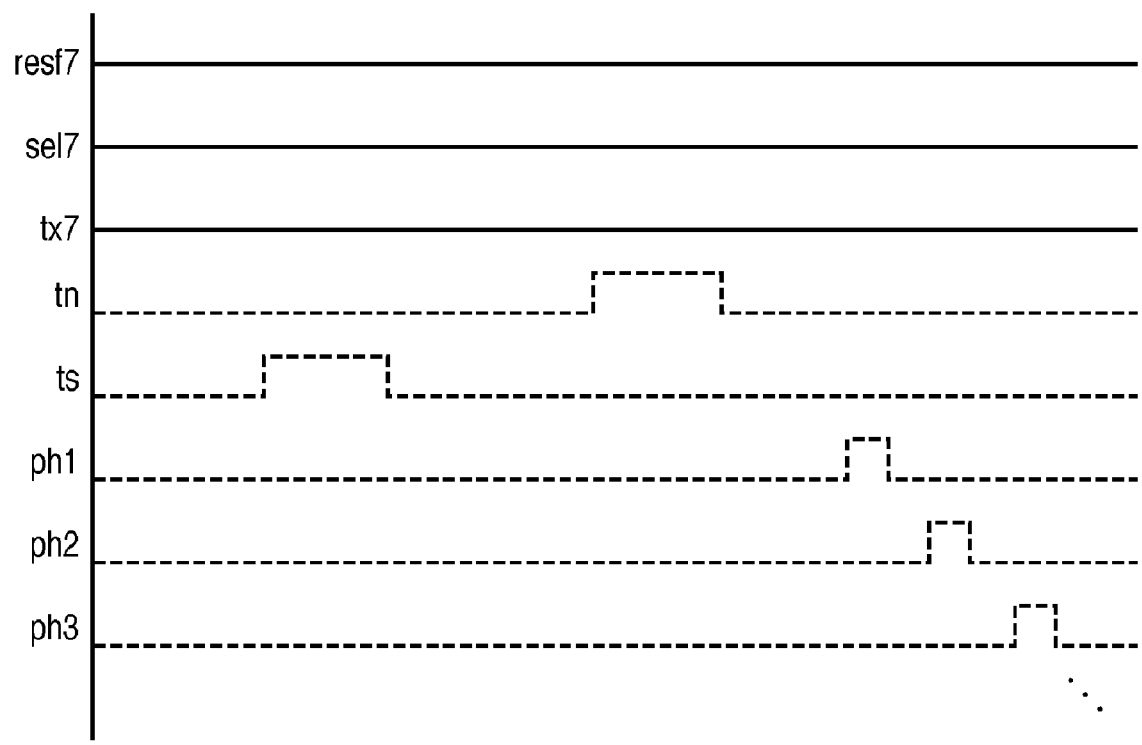
FIG. 24 is a timing chart of a reset operation 2301$a$.

FIG. 24 is a timing chart of the reset operation 2301a. FIG. 24 exemplifies the reset operation 2301a of the seventh row.

The vertical scanning circuit 401 maintains, at a nonactive-level, the second reset control signal "resf7" and transfer control signal "tx7" to be supplied to the pixels on the seventh row. The charge-voltage converters 204 in the pixels on the seventh row are not reset and keep holding signals accumulated in the first accumulation period $T1a7$.

The reset operation 2301a of the seventh row is executed parallel to the first readout operation 1804 of the first row (as represented by waveforms of broken lines) (see FIG. 23).

Figure 25:
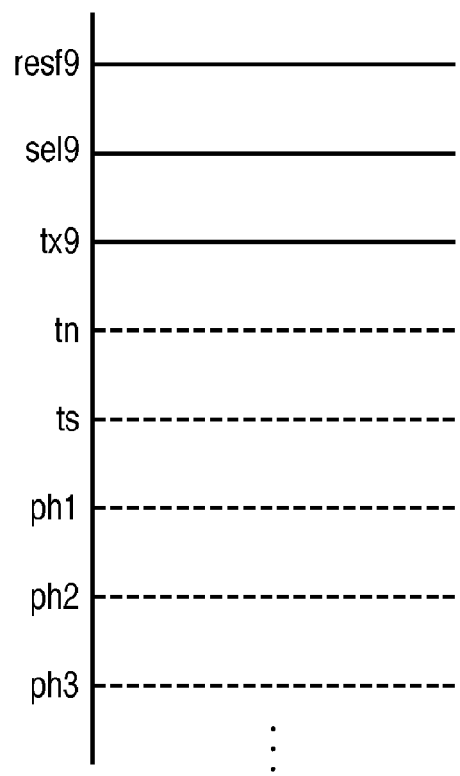
FIG. 25 is a timing chart of a reset operation 2301$b$.

FIG. 25 is a timing chart of the reset operation 2301b. FIG. 25 exemplifies the reset operation 2301b of the ninth row.

The vertical scanning circuit 401 maintains, at a nonactive-level, the second reset control signal "resf9" and transfer control signal "tx9" to be supplied to the pixels on the ninth row. The charge-voltage converters 204 in the pixels on the ninth row are not reset and keep holding signals accumulated in the first accumulation period $T1a9$.

In the movie/still image parallel shooting mode, the second readout operation 2304 indicated by squares of broken lines in FIG. 23 is executed instead of performing the third readout operation 1807. In the second readout operation 2304, the column readout circuits RC1 to RC4 (see FIG. 2) read out signals from some regions of the second pixel group PG2 (FIG. 5) that change between frame periods.

More specifically, in the first frame period FT11, the vertical scanning circuit 401 sequentially selects pixels on the (5n+2)th (second, seventh, and 12th) rows from the second pixel group PG2. The column readout circuits RC1 to RC4 read out the signals (second signals among a plurality of signals which have been accumulated in the pixel array PA in the first accumulation period group $T1a$) of the pixels on the sequentially selected rows.

In the second frame period FT12, the vertical scanning circuit 401 sequentially selects pixels on the (5n+3)th (third, eighth, and 13th) rows from the second pixel group PG2. The column readout circuits RC1 to RC4 read out the signals (second signals among a plurality of signals which have been accumulated in the pixel array PA in the first accumulation period group $T1a$) of the pixels on the sequentially selected rows.

In the third frame period FT13, the vertical scanning circuit 401 sequentially selects pixels on the (5n+4)th (fourth, ninth, and 14th) rows from the second pixel group PG2. The column readout circuits RC1 to RC4 read out the signals (second signals among a plurality of signals which have been accumulated in the pixel array PA in the first accumulation period group $T1a$) of the pixels on the sequentially selected rows.

In the fourth frame period FT14, the vertical scanning circuit 401 sequentially selects pixels on the (5n+5)th (fifth, 10th, and 15th) rows from the second pixel group PG2. The column readout circuits RC1 to RC4 read out the signals (second signals among a plurality of signals which have been accumulated in the pixel array PA in the first accumulation period group $T1a$) of the pixels on the sequentially selected rows.

In the frame periods FT11 to FT14, the column readout circuits RC1 to RC4 read out, from some pixels of the second pixel group PG2 that change between frame periods, a plurality of second signals among a plurality of signals which have been accumulated in the pixel array PA in the first accumulation period group $T1a$.

Figure 26:
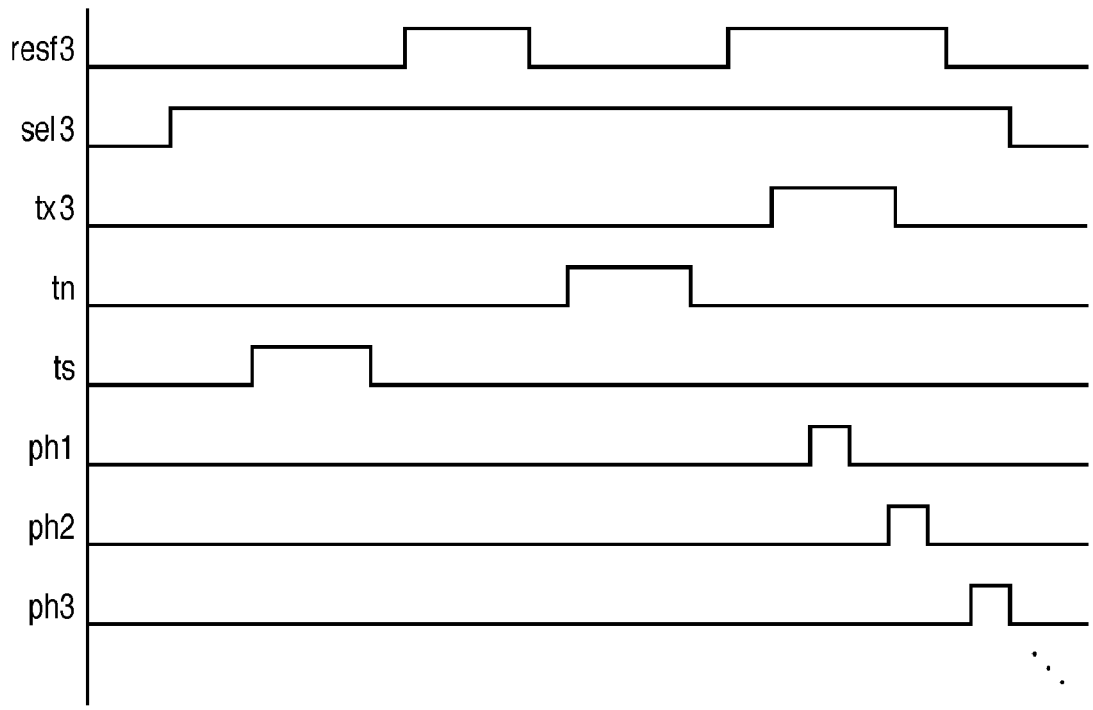
FIG. 26 is a timing chart of a second readout operation 2304.

FIG. 26 is a timing chart of the second readout operation 2304 in the frame period FT12. FIG. 26 exemplifies the second readout operation 2304 of the third row. The second readout operation 2304 in the movie/still image parallel shooting mode is different from the first readout operation (see FIG. 19) in the movie shooting mode in the following point.

While the control signal "ts" is at an active level, the vertical scanning circuit 401 maintains, at a nonactive-level, the transfer control signal "tx3" to be supplied to pixels on the third row. The charge-voltage converters 204 in the pixels on the third row keep holding signals accumulated in the first accumulation period $T1a3$. The output units 205 output S signals corresponding to the voltages of the charge-voltage converters 204 to the column signal lines RL1 to RL4. In the frame period FT12, the column readout circuits RC1 to RC4 read out signals from the pixels on the third row that have been accumulated in the first accumulation period $T1a3$ which starts within the frame period FT10 and ends within the frame period FT11.

Figure 27:
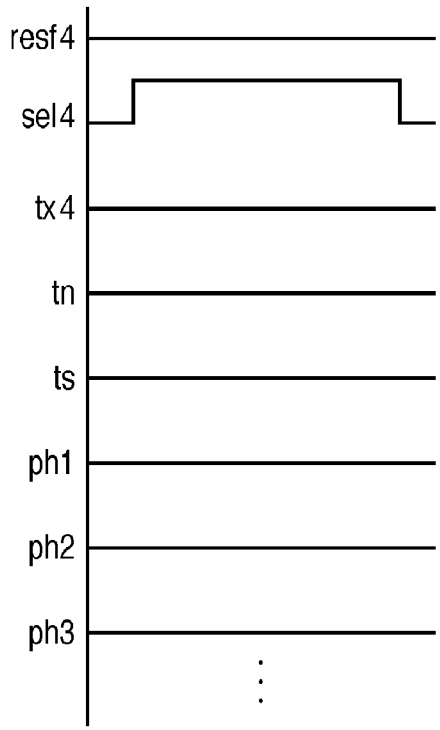
FIG. 27 a timing chart of a thinning-out operation 2305.

In the movie/still image parallel shooting mode, the thinning-out operation 2305 different from that in the movie shooting mode is done. FIG. 27 is a timing chart of the thinning-out operation 2305 in the frame period FT12. FIG. 27 exemplifies the thinning-out operation 2305 of the fourth row. The thinning-out operation 2305 in the movie/still image parallel shooting mode is different from the thinning-out operation (see FIG. 20) in the movie shooting mode in the following point.

The vertical scanning circuit 401 maintains, at a nonactive-level, the transfer control signal "tx4" to be supplied to pixels on the fourth row. The charge-voltage converters 204 in the pixels on the fourth row keep holding signals accumulated in the first accumulation period T1$a$4.

As described above, while suppressing prolongation of the frame periods FT10 to FT14, the image sensing apparatus can generate image signals (image data) for a still image of one frame using the signals of all the pixels $P_{1,1}$ to $P_{15,25}$ that have been accumulated in the first accumulation period group T1$a$.

Figure 28:
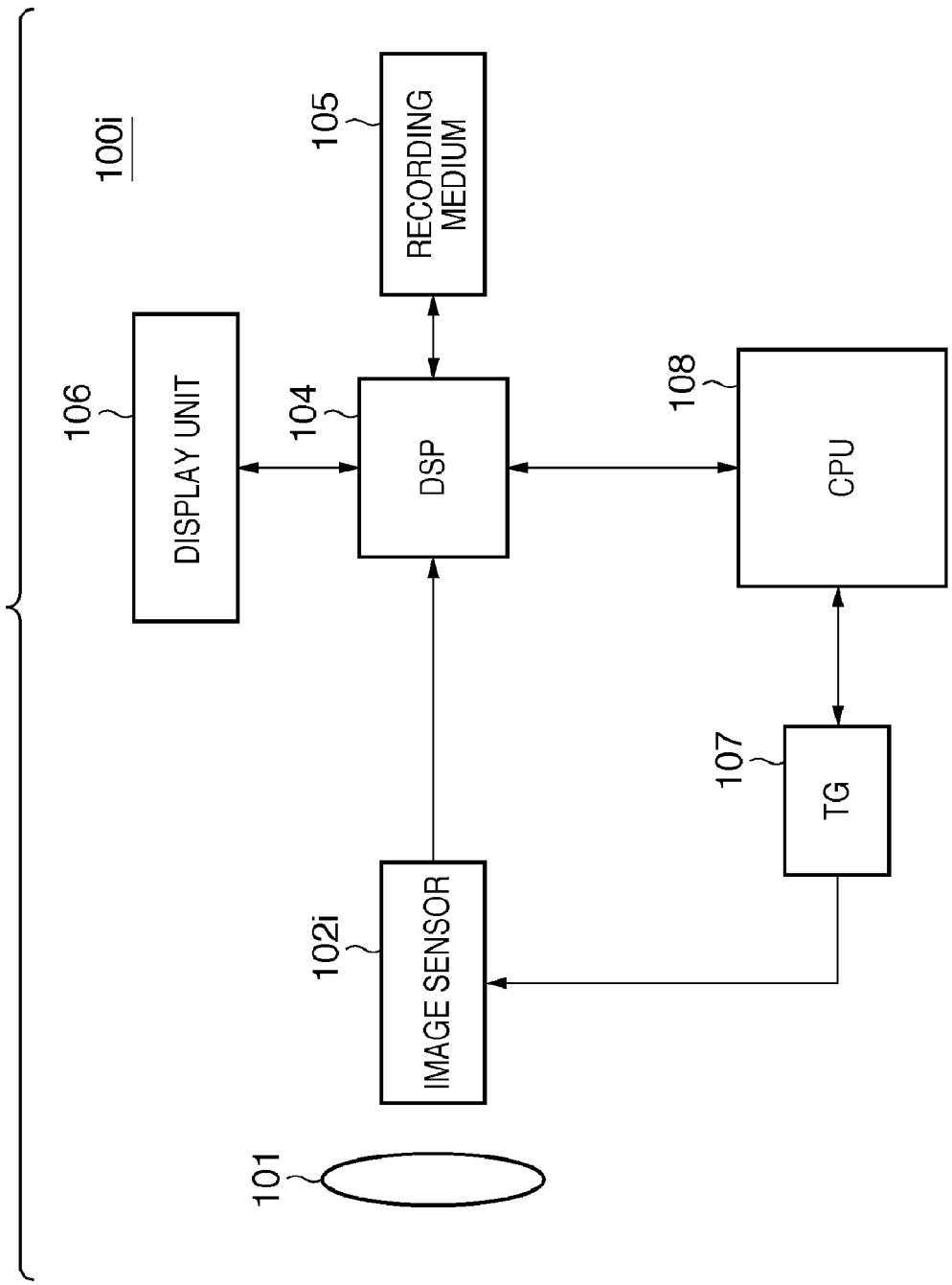
FIG. 28 is a block diagram of the arrangement of an image sensing apparatus 100$i$ according to the fourth embodiment of the present invention.

An image sensing apparatus 100$i$ according to the fourth embodiment of the present invention will be explained with reference to FIG. 28. FIG. 28 is a block diagram of the arrangement of the image sensing apparatus 100$i$ according to the fourth embodiment of the present invention. A difference from the third embodiment will be mainly explained.

The image sensing apparatus 100$i$ does not include the AFE 103, but includes an image sensor 102$i$ in place of the image sensor 102 (see FIG. 1). In the image sensing apparatus 100$i$, the image sensor 102$i$ incorporates an A/D converter, so the AFE 103 is omitted.

Figure 29:
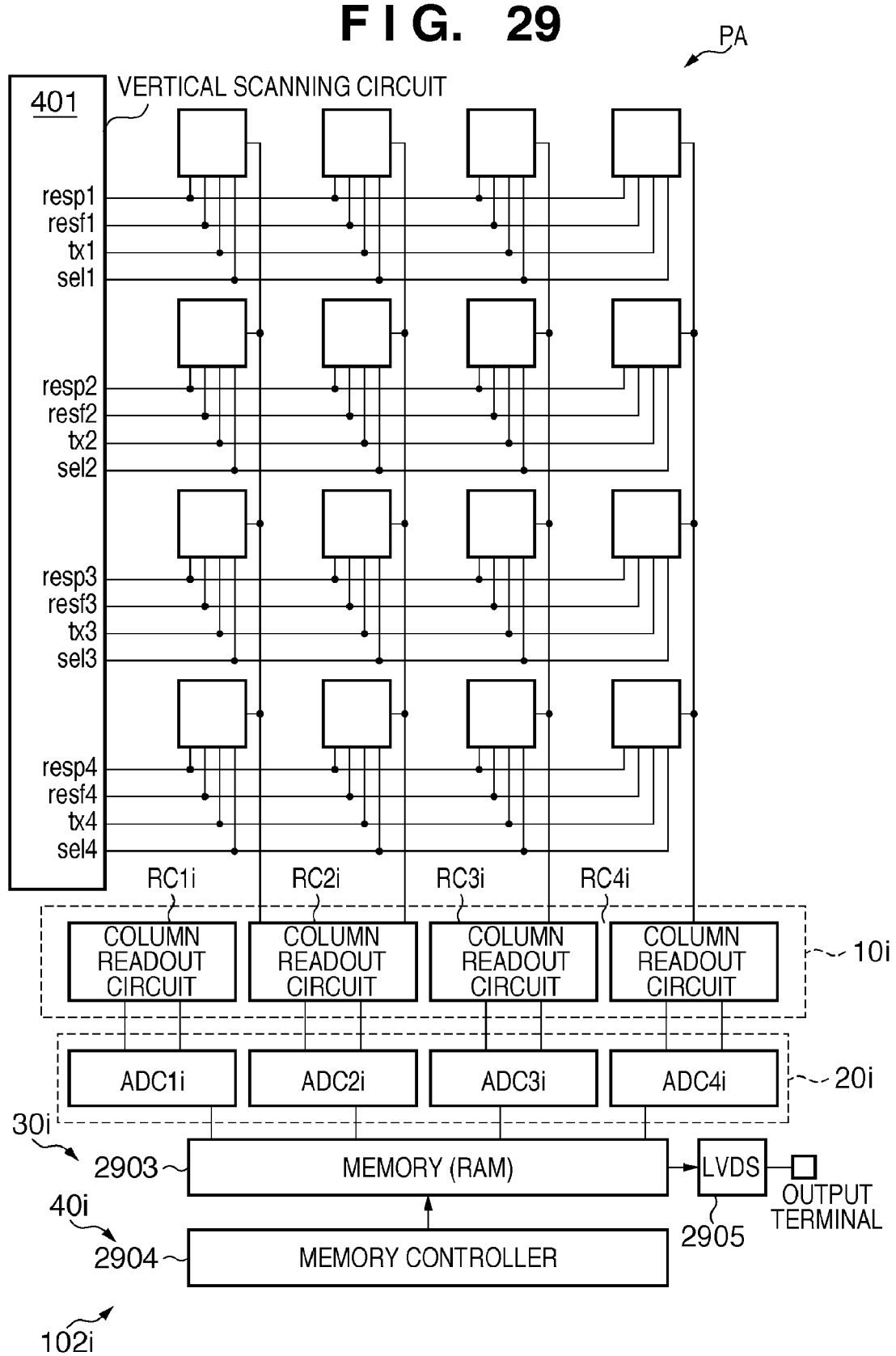
FIG. 29 is a diagram of the arrangement of an image sensor 102$i$ in the fourth embodiment of the present invention.

As shown in FIG. 29, the image sensor 102$i$ includes so-called column A/D (Analog-to-Digital) arrangement using an A/D converter corresponding to each column of a pixel array PA. More specifically, the arrangement of the image sensor 102$i$ is different from that in the first embodiment in the following point. FIG. 29 is a diagram of the arrangement of the image sensor 102$i$ in the fourth embodiment of the present invention.

The image sensor 102$i$ includes a readout unit 10$i$, A/D conversion unit 20$i$, storage unit 30$i$, control unit 40$i$, and LVDS 2905.

Figure 30:
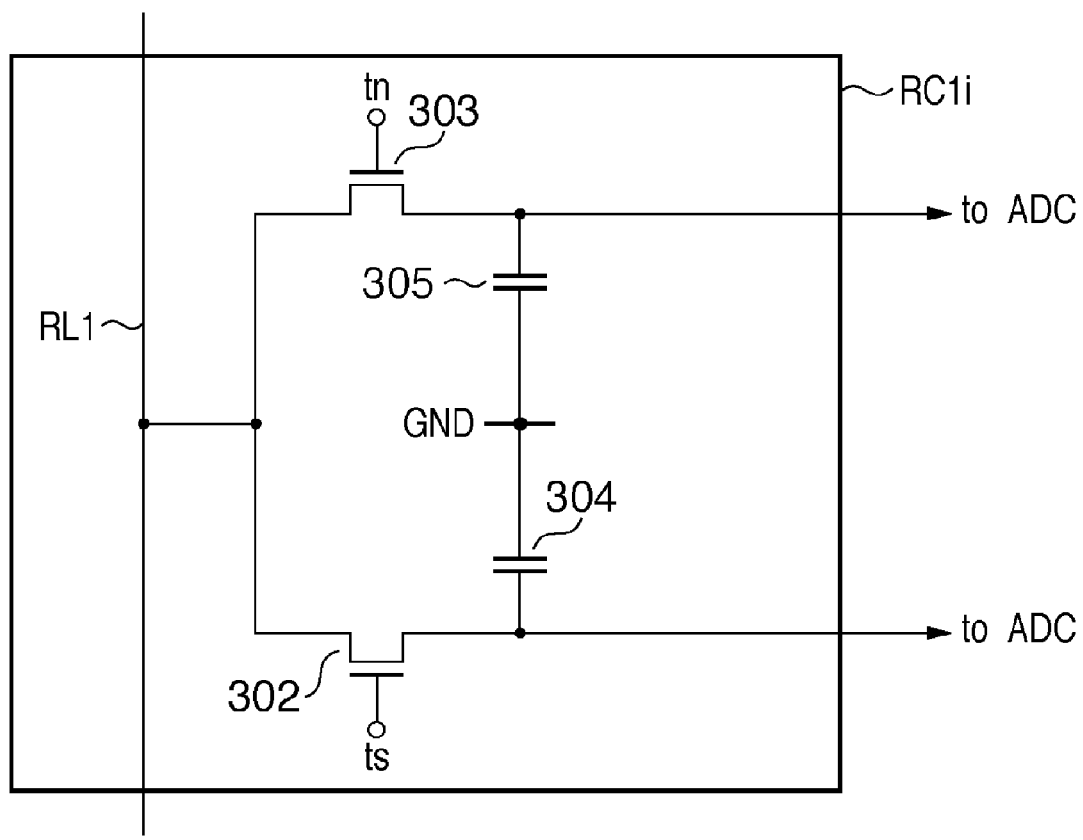
FIG. 30 is a circuit diagram of the structure of a column readout circuit RC1$i$ in the fourth embodiment of the present invention.

The readout unit 10$i$ includes a plurality of column readout circuits RC1$i$ to RC4$i$. As shown in FIG. 30, the internal arrangement of the column readout circuits RC1$i$ to RC4$i$ is different from that in the first embodiment. The column readout circuit RC1$i$ does not include the horizontal transfer switches 306 and 307. Signals held in an S signal holding capacitance 304 and N signal holding capacitance 305 in the column readout circuit RC1$i$ are output to the A/D conversion unit 20$i$. FIG. 30 is a circuit diagram of the structure of the column readout circuit RC1$i$ in the fourth embodiment of the present invention.

The A/D conversion unit 20$i$ shown in FIG. 29 includes a plurality of column A/D converters ADC1$i$ to ADC4$i$. The column A/D converters ADC1$i$ to ADC4$i$ receive signals (S and N signals) output from the column readout circuits RC1$i$ to RC4$i$. Each of the column A/D converters ADC1$i$ to ADC4$i$ A/D-converts the received signal (analog signal), and supplies the converted signal (digital signal) to the storage unit 30$i$.

Examples of the A/D conversion method are ramp conversion to sweep a triangular wave, and successive approximation. The A/D conversion method is arbitrary as long as an analog signal from a pixel can be converted into a digital signal.

The storage unit 30$i$ includes a memory (RAM) 2903. The memory 2903 temporarily stores a signal (digital signal) A/D-converted by the A/D conversion unit 20$i$.

The control unit 40$i$ includes a memory controller 2904. The memory controller 2904 controls an operation to store a signal (digital signal) supplied to the memory 2903 and an operation to transfer a pixel signal from the memory 2903 to the LVDS 2905.

The LVDS 2905 serializes pixel signals (S and N signals) read out from the memory 2903, and generates the difference signal between the S and N signals. The LVDS 2905 outputs the generated difference signal from the output terminal to a subsequent stage (a DSP 104).

When the image sensor converts a pixel signal into a digital signal to output it, outputting serialized signals can advantageously decrease the number of terminals.

When a large-capacity memory is disposed on a stage subsequent to the column A/D converter, pixel signals of one row can be parallel-processed up to the memory. The signal readout speed up to the memory can greatly increase regardless of a subsequent signal transfer speed. This obviates the need to perform a thinning-out operation in readout of pixel signals.

Figure 31:
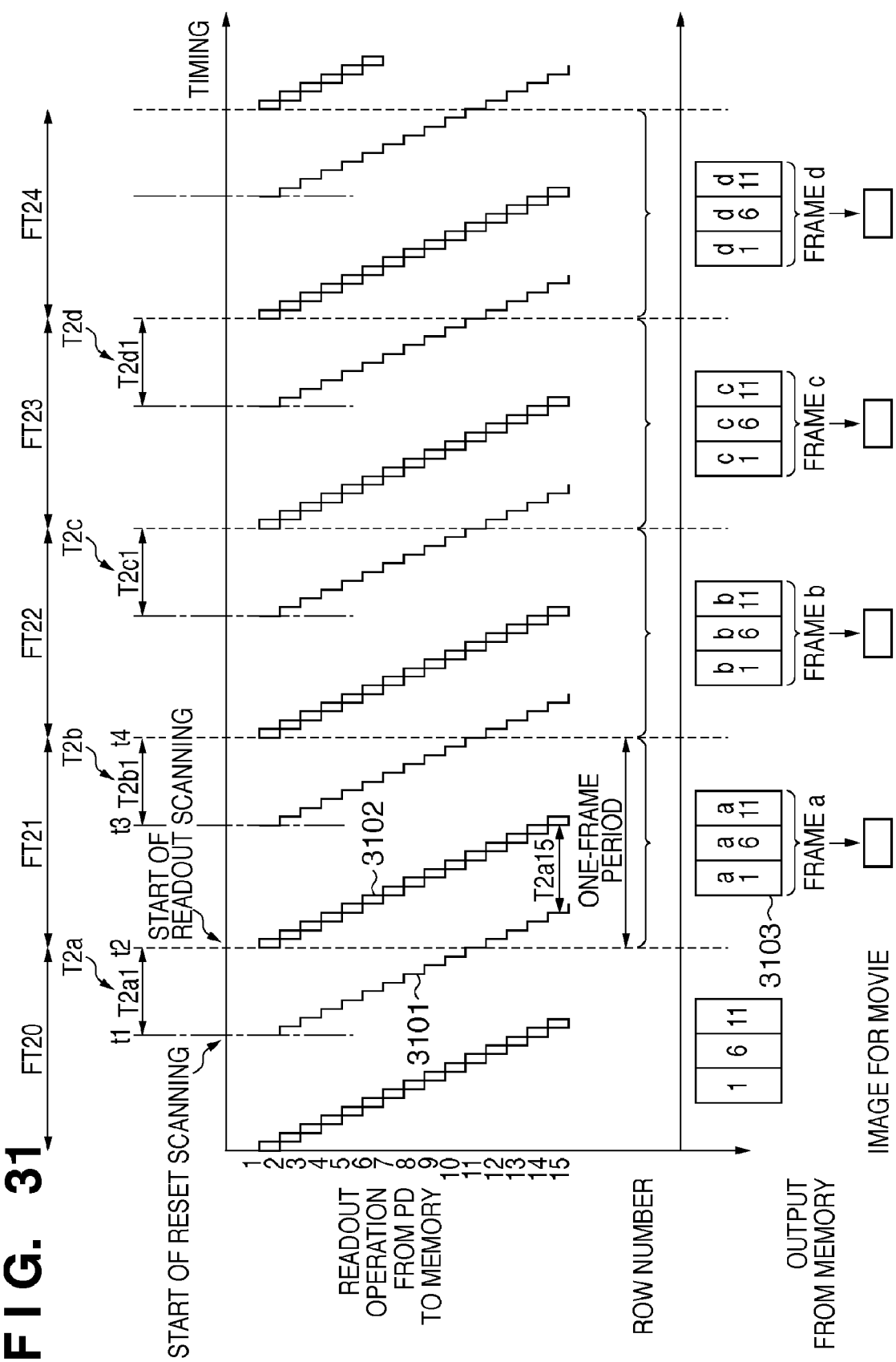
FIG. 31 is a chart schematically showing an operation in the movie shooting mode.

FIG. 31 schematically shows an operation in the movie shooting mode in the fourth embodiment. In FIG. 31, the abscissa axis represents the timing. An upper part of the ordinate axis represents the position of a pixel row associated with a signal readout operation from a photoelectric conversion unit 201 up to the memory 2903. A lower part of the ordinate axis represents a signal output operation from the memory 2903.

As shown in FIG. 31, a first accumulation period group T2$a$ is a group of first accumulation periods T2$a$1 to T2$a$15 which partially overlap each other by the same duration between at least two adjacent rows. More specifically, the completion timing of a reset operation 3101 is delayed from that of the reset operation of an immediately preceding row by the timing taken for a first readout operation 3102 of the immediately preceding row. This makes the first accumulation periods T2$a$1 to T2$a$15 in the first accumulation period group T2$a$ equal to each other. The delay is a constant time (the time of the first readout operation 3102) because no thinning-out operation 1805 is done.

Figure 33:
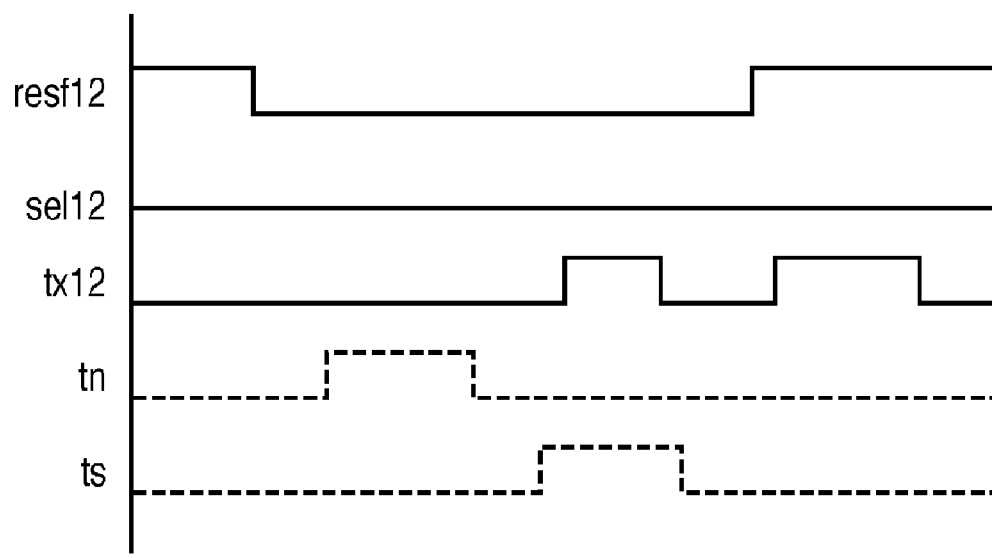
FIG. 33 is a timing chart of a reset operation 3101.

FIG. 33 is a timing chart of the reset operation 3101. FIG. 33 exemplifies the reset operation 3101 of the 12th row.

A vertical scanning circuit 401 changes, from an active level to a nonactive-level, a second reset control signal "resf12" to be supplied to pixels on the 12th row. In response to this, second reset units 206 in the pixels on the 12th row are turned off to cancel reset of charge-voltage converters 204.

The vertical scanning circuit 401 changes, to an active level, the second reset control signal "resf12" and transfer control signal "tx12" to be supplied to the pixels on the 12th row. Then, the photoelectric conversion units 201 in the pixels on the 12th row are reset. While maintaining the second reset control signal "resf12" at an active level, the vertical scanning circuit 401 changes the transfer control signal "tx12" to a nonactive-level.

The reset operation 3101 of the 12th row is performed parallel to the first readout operation 3102 of the first row (as represented by waveforms of broken lines in FIG. 33) (see also FIG. 31).

Figure 32:
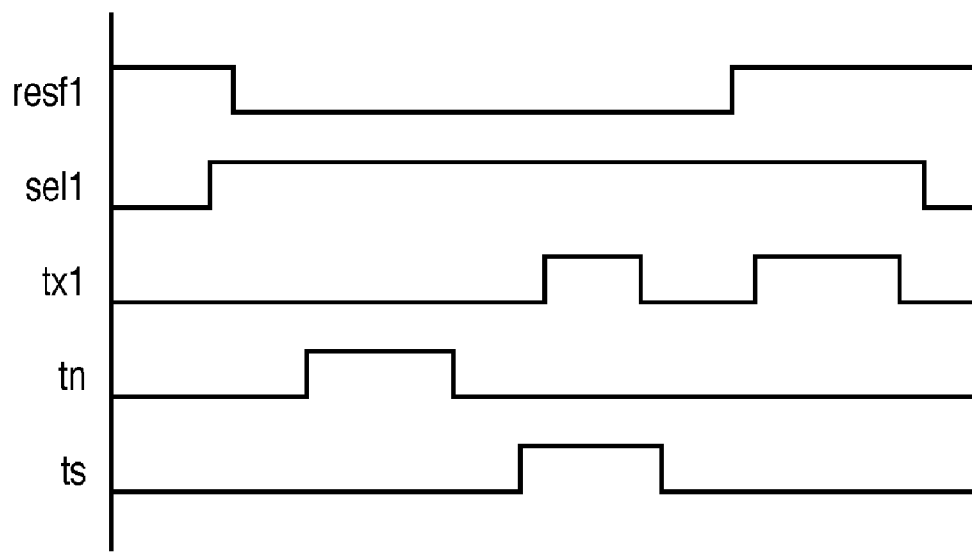
FIG. 32 is a timing chart of a first readout operation 3102.

FIG. 32 is a timing chart of the first readout operation 3102. FIG. 32 exemplifies the readout operation of the first row. The first readout operation in the fourth embodiment is different from the first readout operation (see FIG. 19) in the third embodiment in the following point.

The vertical scanning circuit 401 changes, from a nonactive-level to an active level, a selection control signal "sel1" to be supplied to pixels on the first row. The vertical scanning circuit 401 changes, from an active level to a nonactive-level, a second reset control signal "resf1" to be supplied to the pixels on the first row. Then, the second reset units 206 in the pixels on the first row are turned off to cancel reset of the charge-voltage converters 204. Output units 205 in the pixels on the first row output N signals corresponding to the voltages of the charge-voltage converters 204 to column signal lines RL1 to RL4.

A TG 107 changes, to an active level, a control signal "tn" to be supplied to N signal transfer switches 303. Then, the N signal transfer switches 303 are turned on. The N signal transfer switches 303 transfer N signals passing through the column signal lines RL1 to RL4 to the N signal holding capacitances 305. The TG 107 changes the control signal "tn" to an active level, and the N signal holding capacitances 305 store (hold) the transferred N signals.

The TG 107 changes, to an active level, a control signal "ts" to be supplied to S signal transfer switches 302. In response to this, the S signal transfer switches 302 are turned on. While maintaining the control signal "ts" at an active level, the vertical scanning circuit 401 changes, to an active level, the transfer control signal "tx1" to be supplied to the pixels on the first row. The transfer units 203 in the pixels on the first row transfer charges in the photoelectric conversion units 201 to the charge-voltage converters 204. The output units 205 output S signals corresponding to the voltages of the charge-voltage converters 204 to the column signal lines RL1 to RL4. The S signal transfer switches 302 transfer the S signals passing through the column signal lines RL1 to RL4 to the S signal holding capacitances 304. The TG 107 changes the control signal "ts" to a nonactive-level, and the S signal holding capacitances 304 store (hold) the transferred S signals.

While horizontal transfer signals "ph1" to "ph25" for respective columns sequentially change to an active level, the vertical scanning circuit 401 changes, to an active level, the second reset control signal "resf1" and transfer control signal "tx1" to be supplied to the pixels on the first row. Then, the photoelectric conversion units 201 in the pixels on the first row are reset. While maintaining the second reset control signal "resf1" at an active level, the vertical scanning circuit 401 changes the transfer control signal "tx1" to a nonactive-level.

In an output operation 3103 shown in FIG. 31, the memory controller 2904 controls to output signals stored in the memory 2903 for each row to the DSP 104 via the LVDS 2905 and output terminal.

Letters "a" to "d" in squares represent accumulation period groups T2a to T2d during which signals are accumulated. Numerals "1" to "15" represent pixel rows of signals. For example, "a1" in a square means signals accumulated in the first row in the first accumulation period group T2a.

In each frame period, the control unit 40i controls the memory 2903 to update a plurality of first signals from all the pixels of a first pixel group PG1 ((5n+1)th rows) among a plurality of signals which have been accumulated in the pixel array PA in the accumulation period groups T2a to T2d within an immediately preceding frame period. The control unit 40i transfers the updated first signals from the memory 2903 to the LVDS 2905.

For example, in the movie shooting mode, in a first frame period FT21, the memory controller 2904 transfers, from the memory 2903 to the LVDS 2905, a plurality of first signals "a1", "a6", and "a11" from the first pixel group PG1 ((5n+1)th rows) among a plurality of signals which have been accumulated in the pixel array PA in the first accumulation period group T2a within an immediately preceding frame period FT20.

For example, in the movie shooting mode, in a second frame period FT22, the memory controller 2904 transfers, from the memory 2903 to the LVDS 2905, a plurality of first signals "b1", "b6", and "b11" from the first pixel group PG1 ((5n+1)th rows) among a plurality of signals which have been accumulated in the pixel array PA in the second accumulation period group T2b within the immediately preceding frame period FT21.

The LVDS 2905 supplies a plurality of first signals transferred from the memory 2903 to the DSP 104 via the output terminal. The DSP (generation unit) 104 generates image signals (image data) for a movie of one frame from the first signals read out in each frame period (by executing signal processing such as interpolation processing to interpolate the signals of thinned-out rows).

Figure 34:
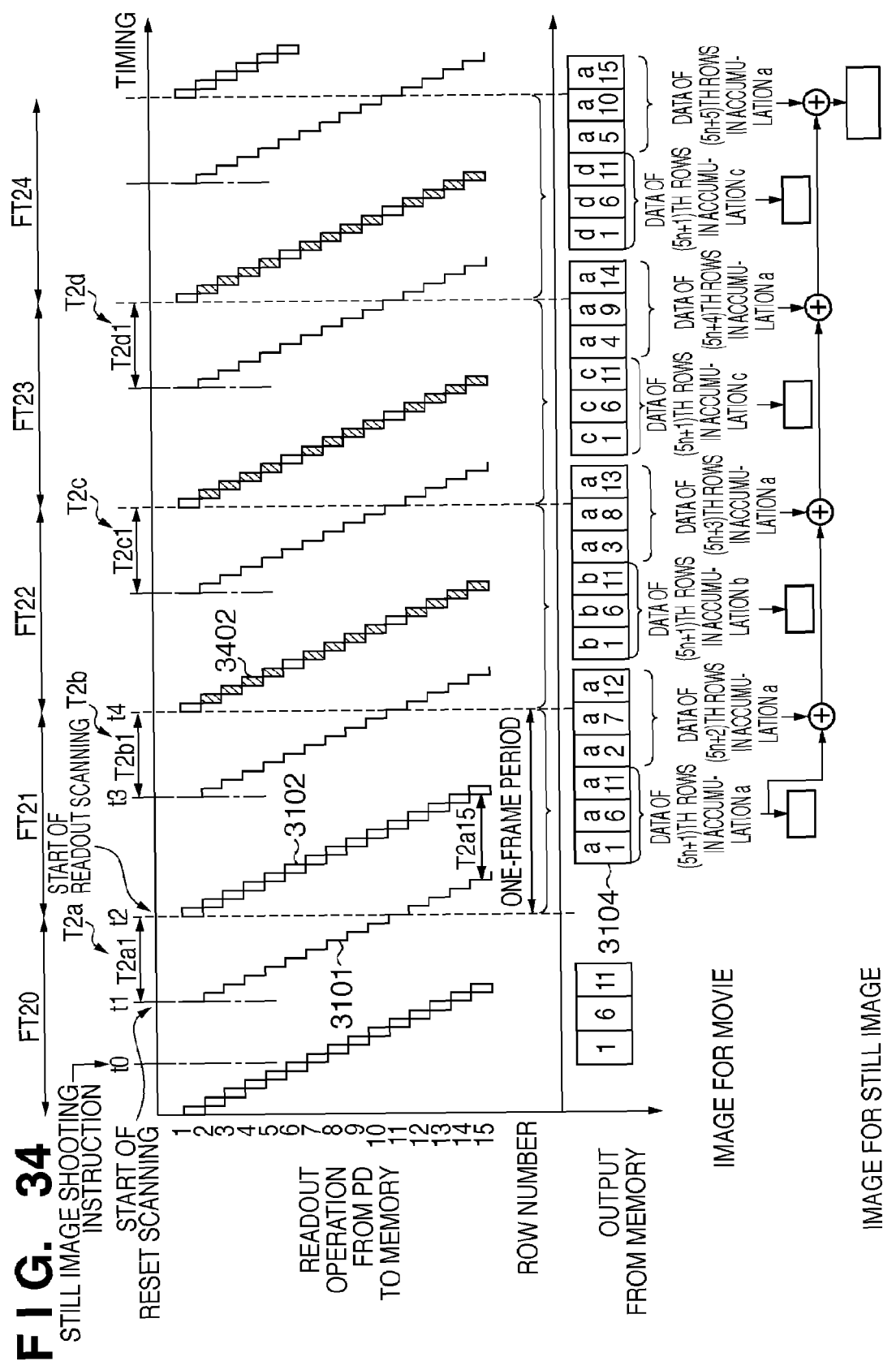

An operation in the movie/still image parallel shooting mode will be explained mainly with reference to FIG. 34. FIG. 34 is a chart schematically showing an operation in the movie/still image parallel shooting mode. A difference from the operation in the movie shooting mode will be mainly explained.

In a fourth readout operation 3402 indicated by hatched squares in FIG. 34, the column readout circuits RC1i to RC4i (see FIG. 29) read out signals from a second pixel group PG2 (see FIG. 5), but the memory 2903 does not store them. More specifically, the memory controller 2904 sequentially skips the signals of the second to fifth rows, seventh to 10th rows, and 12th to 15th rows. The memory 2903 does not store the signals of pixels on the skipped rows.

In the second frame period FT22, therefore, the memory 2903 does not update the signals of the second pixel group PG2 (rows other than the (5n+1)th rows) not used for a movie. The memory 2903 keeps holding a plurality of second signals which have been accumulated from the second pixel group PG2 in the first accumulation period group T2a. In contrast, the memory 2903 updates a plurality of first signals from a first pixel group PG1 ((5n+1)th rows) used for a movie.

Also in a third frame period FT23 and fourth frame period FT24, the memory 2903 does not update the second signals of the second pixel group PG2 (rows other than the (5n+1)th rows) not used for a movie. The memory 2903 keeps holding signals which have been accumulated from the second pixel group PG2 in the first accumulation period group T2a.

The memory controller 2904 transfers, to the LVDS 2905, a plurality of second signals from part of the second pixel group PG2 (see FIG. 5) that have been held in the memory 2903.

More specifically, in the first frame period FT21, the memory controller 2904 selectively reads out the signals (second signals among a plurality of signals which have been accumulated in the pixel array PA in the first accumulation period group T2a) of pixels on the (5n+2)th (second, seventh, and 12th) rows from the second pixel group PG2. Similar to the movie shooting mode, in the first frame period FT21, the memory controller 2904 selectively reads out the signals (first signals among a plurality of signals which have been accumulated in the pixel array PA in the first accumulation period group T2a) of pixels from the first pixel group PG1.

In the second frame period FT22, the memory controller 2904 selectively reads out the signals (second signals among a plurality of signals which have been accumulated in the pixel array PA in the first accumulation period group T2a) of pixels on the (5n+3)th (third, eighth, and 13th) rows from the second pixel group PG2.

In the third frame period FT23, the memory controller 2904 selectively reads out the signals (second signals among a plurality of signals which have been accumulated in the pixel array PA in the first accumulation period group T2a) of pixels on the (5n+4)th (fourth, ninth, and 14th) rows from the second pixel group PG2.

In the fourth frame period FT24, the memory controller 2904 selectively reads out the signals (second signals among a plurality of signals which have been accumulated in the pixel array PA in the first accumulation period group T2a) of pixels on the (5n+5)th (fifth, 10th, and 15th) rows from the second pixel group PG2.

In this manner, in each of the successive frame periods FT21 to FT24, the memory controller 2904 reads out, from some pixels of the second pixel group PG2 that are different from each other between frame periods, a plurality of second signals among a plurality of signals which have been accumulated in the pixel array PA in the first accumulation period group T2a. The LVDS 2905 supplies first and second signals read out by the memory controller 2904 to the DSP 104 via the output terminal. The DSP (generation unit) 104 composes the first signals read out by the memory controller 2904 in the first frame period FT21 and the second signals read out by the memory controller 2904 in the frame periods FT21 to FT24. Accordingly, the DSP 104 generates image signals for a still image of one frame.

According to the fourth embodiment, a memory which holds digital values implements a storage unit which temporarily holds the signals of pixels used not for a movie but for a still image. The storage unit can therefore be relatively easily configured as a large-capacity memory.

Holding signals read out from pixels in the digital memory can avoid problems (e.g., a leakage current arising from a small defect) which occur in an analog memory.

In the embodiments, pixels used for a movie and those not used for it are discriminated by rows. However, the use of the digital memory also makes it possible to discriminate pixels by rows and also by columns (horizontally). In other words, pixels used for a movie and those not used for it may also be discriminated by pixels. In this case, pixels to update data for each frame and those not to update it can be more finely controlled, more efficiently transferring signals (N and S signals) for a still image.

An S signal can be read out after reading out an N signal, thereby removing reset noise. This can easily improve the image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-159692, filed Jun. 18, 2008, which is hereby incorporated by reference herein in its entirety.

What is claimed is:

1. An image sensing apparatus comprising:
a pixel array in which a plurality of pixels are arrayed in a direction along a row and a direction along a column, the plurality of pixels including a first pixel group and a second pixel group;
a driving unit which causes the first pixel group to perform accumulation operations of first signals in each of successive frame periods, and causes the second pixel group to perform accumulation operations of second signals in a first frame period of the successive frame periods;
a readout unit which, when performing still image shooting parallel to movie shooting, reads out, in each of the successive frame periods, the first signals from the first pixel group, and reads out, over the successive frame periods, the second signals of the first frame period from pixels of the second pixel group that are different from each other between the successive frame periods; and
a generation unit which generates an image signal for a movie of one frame in each of the successive frame periods from the first signals read out in each of the successive frame periods, and also generates an image signal for a still image of one frame in the first frame period by composing the first signals read out in the first frame period and the second signals read out over the successive frame periods.

2. The apparatus according to claim 1, wherein, when still image shooting is performed parallel to movie shooting, the readout unit decreases a ratio of the number of pixels of the first pixel group to the number of pixels of the second pixel group, compared to a case in which movie shooting is performed without performing still image shooting.

3. The apparatus according to claim 2, wherein, when the ratio is decreased, the readout unit increases the number of pixels of the second pixel group from which the second signals are read out in each of the successive frame periods, compared to a case in which the ratio is not decreased.

4. The apparatus according to claim 1, wherein each of the plurality of pixels includes
a photoelectric conversion unit,
a charge holding unit,
a transfer unit which transfers charges generated in the photoelectric conversion unit to the charge holding unit, and
an output unit which outputs a signal corresponding to a voltage of the charge holding unit, and
the driving unit drives pixels of the first pixel group to cause the transfer unit to transfer charges generated in the photoelectric conversion unit to the charge holding unit in each frame period, and drives pixels of the second pixel group to cause the charge holding unit to keep holding, over the successive frame periods, charges generated in the photoelectric conversion unit in the first frame period.

5. The apparatus according to claim 1, further comprising:
an A/D conversion unit which A/D-converts the first signals and the second signals read out from the pixel array;
a storage unit which stores the first signals and the second signals A/D-converted by the A/D conversion unit; and
a control unit which controls the storage unit to update the first signals stored in the storage unit in each of the successive frame periods, and to keep holding the second signals stored in the storage unit over the successive frame periods.

* * * * *